United States Patent [19]
Aoki et al.

[11] Patent Number: 5,493,556
[45] Date of Patent: Feb. 20, 1996

[54] MULTI-DISK PLAYER/RECORDER WITH BIASED LOCKING MEANS FOR DISK CASSETTES

[75] Inventors: Shinichi Aoki; Akihiro Kishishita, both of Tottori, Japan

[73] Assignees: Sanyo Electric Co., Ltd., Moriguchi; Tottori Sanyo Electric Co., Ltd., Tottori, both of Japan

[21] Appl. No.: 191,328

[22] Filed: Feb. 3, 1994

[30] Foreign Application Priority Data

Feb. 16, 1993 [JP] Japan .................... 5-051346
Mar. 23, 1993 [JP] Japan .................... 5-064016

[51] Int. Cl.[6] .................... G11B 15/68; G11B 17/22
[52] U.S. Cl. .................... 369/191; 369/34; 360/98.04
[58] Field of Search .................... 369/191, 34, 36, 369/38, 194, 192; 360/98.01, 98.04, 92, 99.02

[56] References Cited

U.S. PATENT DOCUMENTS

| | | | |
|---|---|---|---|
| 4,685,095 | 8/1987 | Rudy et al. | 369/36 |
| 4,797,865 | 1/1989 | Imai et al. | 369/36 |
| 4,949,324 | 8/1990 | Arata | 369/36 |
| 5,006,940 | 4/1991 | Hamachi et al. | 360/92 |
| 5,136,562 | 8/1992 | Staar | 369/36 |
| 5,274,516 | 12/1993 | Kakuta et al. | 360/98.04 |
| 5,377,175 | 12/1994 | Nehl | 369/292 |

FOREIGN PATENT DOCUMENTS

| | | |
|---|---|---|
| 0490671 | 6/1992 | European Pat. Off. . |
| 3513606 | 10/1986 | Germany . |
| 3638912 | 5/1988 | Germany . |
| 61-258366 | 11/1986 | Japan . |

*Primary Examiner*—Stuart S. Levy
*Assistant Examiner*—Kevin M. Watkins
*Attorney, Agent, or Firm*—Darby & Darby

[57] ABSTRACT

In a multi-disk player having a loading and unloading equipment for selecting an arbitrary disk cassette from a containing portion for containing a plurality of trays each supporting one disk cassette in which a disk-shaped record medium is contained in a cassette case with they being arranged in a lot of upper and lower stages, loading the selected disk cassette into a record playing equipment disposed behind the containing portion and returning the same to its original position in the containing portion from the recording playing equipment after the playing of the disk cassette is terminated, the containing portion has a plurality of ejecting operating means for each releasing a locking function for disk cassette so that the operating means corresponding to an arbitrary disk cassette in the containing portion is operated to eject the disk cassette toward the front of the containing portion.

10 Claims, 15 Drawing Sheets

MULTI-DISK PLAYER/RECORDER WITH
BIASED LOCKING MEANS FOR DISK
CASSETTES

BACKGROUND OF THE INVENTION

1. Field of the Invention

The present invention relates to a multi-disk player for selecting and taking one optical disk out of a lot of optical disks to load the same into record playing equipment, and taking out the optical disk from the record playing equipment after playing records on the optical disk.

2. Description of the Background Art

In recent years optical disk players for playing records on optical disks have spread widely. Some of the optical disk players comprise a multi-disk player for selecting and taking one optical disk out of a lot of optical disks contained in a desk containing portion to load the same into a record playing equipment, and taking out the optical disk from the record playing equipment after playing records on the optical disk to return the same to its original position in the deck containing portion.

This multi-disk player comprises a box-shaped or groove-shaped chassis, a containing portion for containing a plurality of optical disks (compact disks) arranged in a stack having upper and lower stages in the chassis, and a disk loader for loading one disk selected out of the plurality of disks into the record playing equipment from the containing portion and returning the disk in the record playing equipment to its original position in the containing portion, as disclosed in, for example, Japanese Patent Laid-Open Gazette No. 52251/1989.

The containing portion comprises a magazine formed in the shape of a box whose one side surface is open, and the disks are put one at a time on thin plate-shaped trays arranged in a stack having upper and lower stages in the magazine. An insertion port for getting the magazine in and out of the chassis is provided on the front surface of the chassis, and the magazine containing a lot of disks is gotten in and out of the containing portion through the insertion port. This insertion port is generally opened and closed by a front panel which is provided with various keys used for operating a multi-disk player, an AM/FM radio and the like.

The above described disk loader removes an arbitrary selected disk, together with a tray on which the disk is placed, from the magazine loaded in the containing portion to load the same into the record playing equipment, and takes out the tray and the disk from the record playing equipment after the playing is terminated to return the tray and the disk to their original position in the magazine.

The record playing equipment has a clamper provided opposed to a spindle, receives the disk from the magazine and then, raises this clamper to lift the disk from the tray so that the center of the disk is interposed between the spindle and the clamper, and is so constructed as to read records in a required position on the disk by moving an optical head in the radial direction of the disk while rotating the spindle and the clamper.

The above described disk loader comprises a sliding device for horizontally moving the disk throughout from the containing portion to the record playing equipment and an elevator device for causing a height at which the record playing equipment receives the disk and the height of the selected disk in the containing portion to correspond to each other because the record playing equipment is disposed at the left, the right or the rear of the containing portion.

The above described sliding device includes is of either a swing type as to rotate a tray around one of the corners and of a reciprocating type as to linearly move the tray in the direction in which the containing portion and the record playing equipment are arranged.

The latter described sliding device in which the moving space of the tray is not projected toward the sides of the containing portion and the record playing equipment is preferable in terms of miniaturization. It is considered that the sliding device will be most commonly used in the future.

The above described sliding device of a reciprocating type comprises a sliding member which is provided movably back and forth in the horizontal direction in which the containing portion and the record playing equipment are arranged and a reciprocating driving device for driving the sliding member back and forth. The above described sliding member has an engaging portion which is engaged and disengaged with and from the tray from above and below.

Furthermore, the above described sliding member is provided with a rack having a gear train arranged in the direction of the movement of the sliding member. The reciprocating driving device comprises the rack, one pinion gear rotatably supported on the chassis and engaged with the rack, and an actuator for driving the gear in both the forward and reverse directions.

The pinion gear is driven in the forward and reverse directions by the actuator to drive the sliding member having the engaging portion engaged with the tray back and forth. Consequently, the selected tray and the disk put thereon move back and forth between the containing portion and the record playing equipment.

The above described elevator device includes one of such a type as to raise and lower the magazine and one of such a type as to raise and lower the record playing equipment and the sliding device. The former is most commonly used when the number of disks is small and the magazine is smaller than the record playing equipment, while the latter is most commonly used when the number of disks is large and the magazine is larger than the record playing equipment.

An arbitrary disk can be held in each of the trays in the magazine. In addition, some trays can be kept empty. After the magazine is loaded into the containing portion once, each of the trays is moved from the magazine to the record playing equipment by the disk loader, and it is determined whether or not the disk is loaded into the record playing equipment to determine whether or not the tray is empty. If the tray is empty, the disk loader is subjected to an unload operation to return the tray to its original position in the magazine and indicate that the tray is empty by lighting a lamp as required.

The above described containing portion is provided with an ejecting device for taking out the magazine loaded therein. The ejecting device is so constructed as to prevent the disk and the tray which are moving between the magazine and the record playing equipment from being damaged as well as inhibit or nullify the operation of the ejecting device while the disk loader is being operated and the record playing equipment is being operated so as to reliably return the disk and the tray to their original position in the magazine from the record playing equipment.

As described in the foregoing, if the multi-disk player is so constructed that the operation of the ejecting device is inhibited or nullified while the disk loader is being operated and the record playing equipment is being operated, it cannot take out the disk remaining in the magazine and replace the disk with another disk or insert the disk into the empty tray in the magazine unless it waits until the playing of records on the disk is terminated to return the disk to the magazine or interrupts the playing of the records to return the disk to the magazine. Accordingly, the multi-disk player is inconvenient for use.

SUMMARY OF THE INVENTION

Therefore, an object of the present invention is to provide a multi-disk player capable of taking out a record medium remaining in a containing portion during recording or playing, replacing the record medium with another record medium and adding a disk.

In order to attain the object, in a multi-disk player comprising a plurality of trays, each supporting one disk cassette in which a disk-shaped record medium is contained in a cassette case with the surface of the record medium being directed upward and downward, a containing portion for containing the plurality of trays so as to be extractable backward and arranged in a stack of upper and lower stages, and loading and unloading equipment for loading one disk cassette arbitrarily selected out of a plurality of disk cassettes in the containing portion into a recording and/or playing equipment disposed behind the containing portion from the containing portion and returning the same to its original position in the containing portion from the recording and/or playing equipment after the recording or playing of the disk cassette is terminated. Each of the above described trays has a catching member supported movably back and forth on an end on the side of the recording and/or playing equipment of the tray for catching an end surface on the side of the recording and/or playing equipment of the disk cassette which is inserted and extracted into and from the tray, bias means for urging the catching member toward the front of the containing portion, and a locking member for locking the disk cassette pushed into the tray against the bias means in a predetermined position. The above described containing portion has a plurality of ejecting operating means for releasing the locking function of each of the locking members.

In the present invention thus constructed, the disk cassettes other than the disk cassette arbitrarily selected, along with the trays for supporting the respective disk cassettes, are left in the containing portion. In the tray holding the disk cassette out of the remaining trays, the disk cassette is locked in the position where the catching member catches the end surface on the side of the recording and/or playing equipment of the disk cassette pushed into the tray against the bias means.

If at an arbitrary time, that is, while one disk cassette arbitrarily selected is being recorded or played, while one disk cassette arbitrarily selected is being moved between the recording and/or playing equipment and the containing portion, or while all the disk cassettes are contained in the containing portion, the operating means corresponding to another one disk cassette arbitrarily selected out of the disk cassettes contained in the containing portion is operated, the locking function of the locking member corresponding to the operating means is released. Consequently, the catching member of the corresponding tray is urged forward by the bias means and moved, whereby the disk cassette in the tray is pushed by the catching member and ejected forward.

Consequently, the multi-disk player can eject the disk cassette in the containing portion toward the outside of the containing portion without waiting until writing or reading of records on the record medium in the disk cassette which is being recorded or played is terminated to return the disk cassette to the containing portion or without interrupting the writing or reading of records to return the disk cassette to the containing portion. Accordingly, the multi-disk player is much more convenient for use.

In the present invention, a plate spring used for positioning the disk cassette in the tray can be also used as the locking means. In addition, the catching member is constituted by a plate spring formed to connect with the plate spring so that it can simultaneously play a role of the bias means.

In this case, however, it is not necessarily easy to form a series of plate springs in a predetermined shape. Unless the plate spring for positioning the disk cassette is formed in a shape permitting its function, the disk cassette pushed into the tray is ejected against its will.

Therefore, the present invention also has as an object to reliably prevent the disk cassette from being ejected against its will.

In order to attain the object, in the present invention, there are provided a horizontal plate provided in the catching member along the upper surface or the lower surface of the tray, bias means stretched between the horizontal plate and the tray for urging the catching member forward, a latch lever supported on the tray so as to be displaceable throughout from a latch position where the catching member is received from the front to a releasing position where it is not received, a second bias means for urging the latch lever toward the latch position, and operating means for moving the latch lever to the releasing position against the second bias means.

This latch lever can be so constructed as to be moved rightward and leftward ahead of a front edge of the horizontal plate which retracts to a predetermined position by loading the disk cassette into the tray. In this case, however, the latch lever must be moved from the latch position to the releasing position. On the other hand, the above described operating means comprises an operating tool which is operated on the front surface of the multi-disk player. However, a key which is operated so as to be pushed backward for the purpose of easy operation is most commonly used as the operating tool. In such construction, there may be provided a cam which is interlocked with the key so as to move the latch lever in a direction at right angles to the direction of operation of the key and a cam follower causing the latch lever to follow the cam, and the cam lever may be provided with an inclined surface inclined toward the inside of the tray in the rear of the cam lever to catch a rod, and a plate or the like which is interlocked with the key.

Furthermore, a latch lever having a pin entering a latch slit formed in the horizontal plate and a lever projected toward the left or the right of the tray and supported on the tray so as to be horizontally rotatable around one point which is off-centered from the pin can be used as the above described latch lever.

In this case, the above described latch slit comprises a longitudinal slit extending backward and forward in order for the catching member including the horizontal plate to be movable in a predetermined range and a transverse slit connecting with a front end of the longitudinal slit and extending rightward and leftward so as to catch the horizontal plate from the front by the pin in the position where the catching member retracts.

The catching member is supported slidably back and forth and the bias means is stretched between the catching member and the main body of the tray, while the catching member is provided with a latch slit comprising a longitudinal slit extending backward and forward and a transverse slit extending to connect with a front end of the longitudinal slit either rightward or leftward. The multidisk player is provided with a latch lever having a pin entering the latch slit and a lever projected toward either the right or the left of the tray and supported on the main body of the tray so as to be horizontally rotated around a position which is off-centered from the pin and second bias means for urging the latch lever in the direction in which the pin enters the transverse slit.

If the catching member is pushed into a predetermined position by the disk cassette, therefore, the pin enters the transverse slit from the longitudinal slit, whereby the catching member is not moved forward. The latch lever is rotated in the direction in which the pin is moved toward the longitudinal slit by the operating member. If the pin enters the longitudinal slit, the catching member can be moved forward. Consequently, the catching member is urged forward by the bias means to eject the disk cassette.

Furthermore, it is preferable that the loading and unloading equipment according to the present invention comprises a sliding device for horizontally moving the disk cassette throughout from the containing portion to the recording and/or playing equipment so as to smoothly load the tray and the disk cassette into the recording and/or playing equipment from the containing portion and return the tray and the disk cassette to the containing portion from the recording and/or playing equipment, an elevator device for raising and lowering the sliding device to a height corresponding to the height of the selected disk cassette, a disk cassette receiving frame provided in the recording and/or playing equipment for receiving the selected disk cassette from the containing portion, and a second elevator device for raising and lowering the height of the disk cassette receiving frame to a height corresponding to the height of the selected disk in the containing portion.

This construction comprises two elevator devices. In the present invention, it is considered that the respective elevator devices are provided with dedicated motors. However, motors are high in cost as components, and the reduction of the number of motors is effective for the reduction of the entire cost. Further, it is preferable that the sliding device and the disk cassette receiving frame are synchronously raised and lowered so as to smoothly transfer the tray and the disk cassette between the containing portion and the disk cassette receiving frame.

Therefore, the present invention also has for its object to synchronize the sliding device and the disk cassette receiving frame with each other as well as reduce the number of motors to make the entire cost low.

In order to attain the object, in the present invention, there are provided means for interlocking both the elevator devices and a common motor for driving both the elevator devices.

In the present invention, it is preferable to detect the position of a movable member which is moved with respect to a member to be a basis of the sliding device and the elevator devices in order to control the operation of the loading and unloading equipment. In order to detect the position of the movable member, one of the member to be a basis and the movable member may be provided with a portion to be detected corresponding to the stop position of the movable member, and the other member may be provided with a sensor driven by the portion to be detected.

As the above described portion to be detected, only one portion to be detected may be provided. Alternatively, a plurality of portions to be detected may be provided properly spaced in the direction of the movement of the movable member. If only one portion to be detected is provided, sensors are disposed properly spaced in the direction of the movement of the movable member. On the other hand, a plurality of portions to be detected are provided, one sensor may be provided in one place along a moving path of the portions to be detected.

The former is favorable in that the shape of the member to be a basis or the movable member which is provided with the portion to be detected is simplified so that the component cost can be made low. The latter is favorable in that the number of sensors is decreased to one so that the entire cost can be made low.

The foregoing and other objects, features, aspects and advantages of the present invention will become more apparent from the following detailed description of the present invention.

DESCRIPTION OF THE PREFERRED EMBODIMENTS

Figure 1:
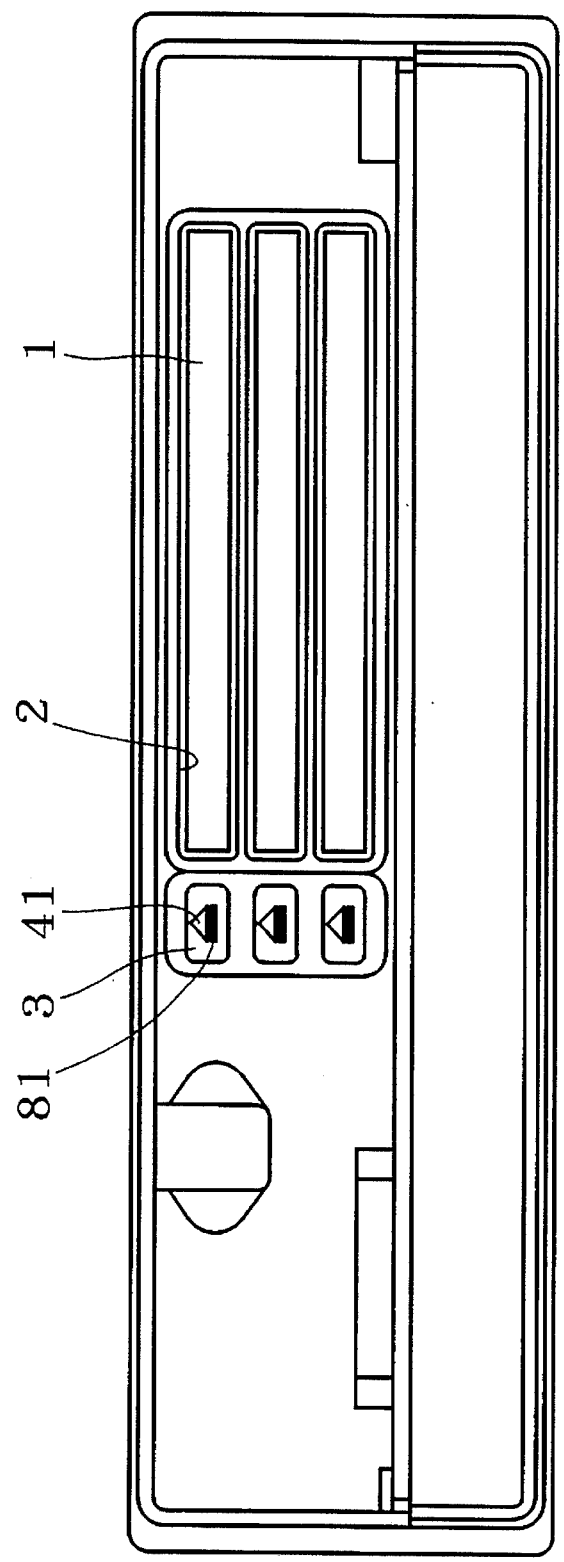
FIG. 1 is a front view showing one embodiment of the present invention from which a front panel is removed.

A multi-disk player according to one embodiment of the present invention shown in FIG. 1 is combined with an AM/FM radio receiver and a CD player carried by an automobile.

Three slit-shaped insertion ports 2 are formed on the front surface of the multi-disk player so as to load three optical disk cassettes 1, and an ejection key 3 used for an ejecting operation is provided at the left side of each of the insertion ports 2.

Figure 2:
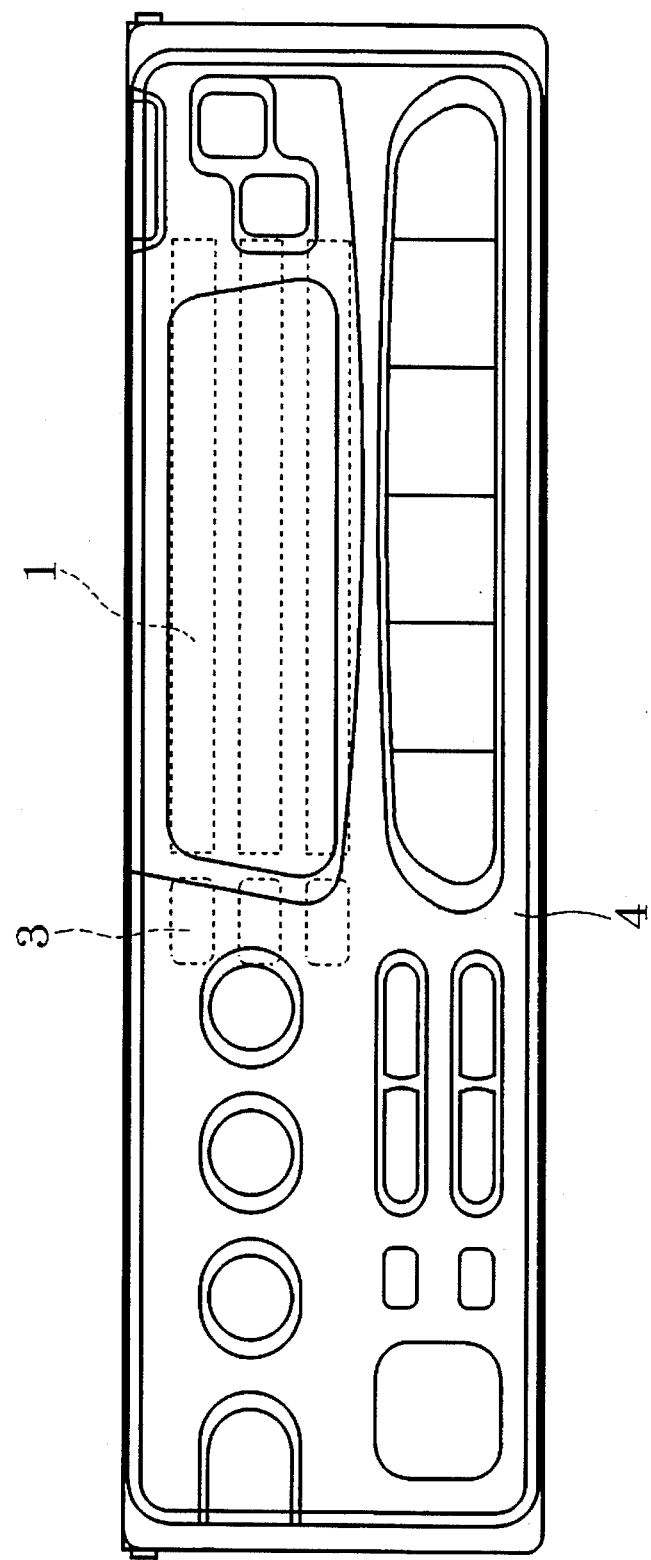
FIG. 2 is a front view showing one embodiment of the present invention.

As shown in FIG. 2, a front panel 4 is provided on the front surface of the multi-disk player. If the front panel 4 is moved downward to the front, the front surface of the multi-disk player is opened. Consequently, the three insertion ports 2 and the three ejection keys 3 are exposed, thereby to make it possible to insert, discharge and replace the optical disk cassettes 1.

Keys such as various control keys of the multi-disk player and the FM/AM radio, a CD player and the like, a locking releasing key of a locking device for locking the front panel 4 in its closed position are provided on the front surface of the front panel 4.

Figure 3:
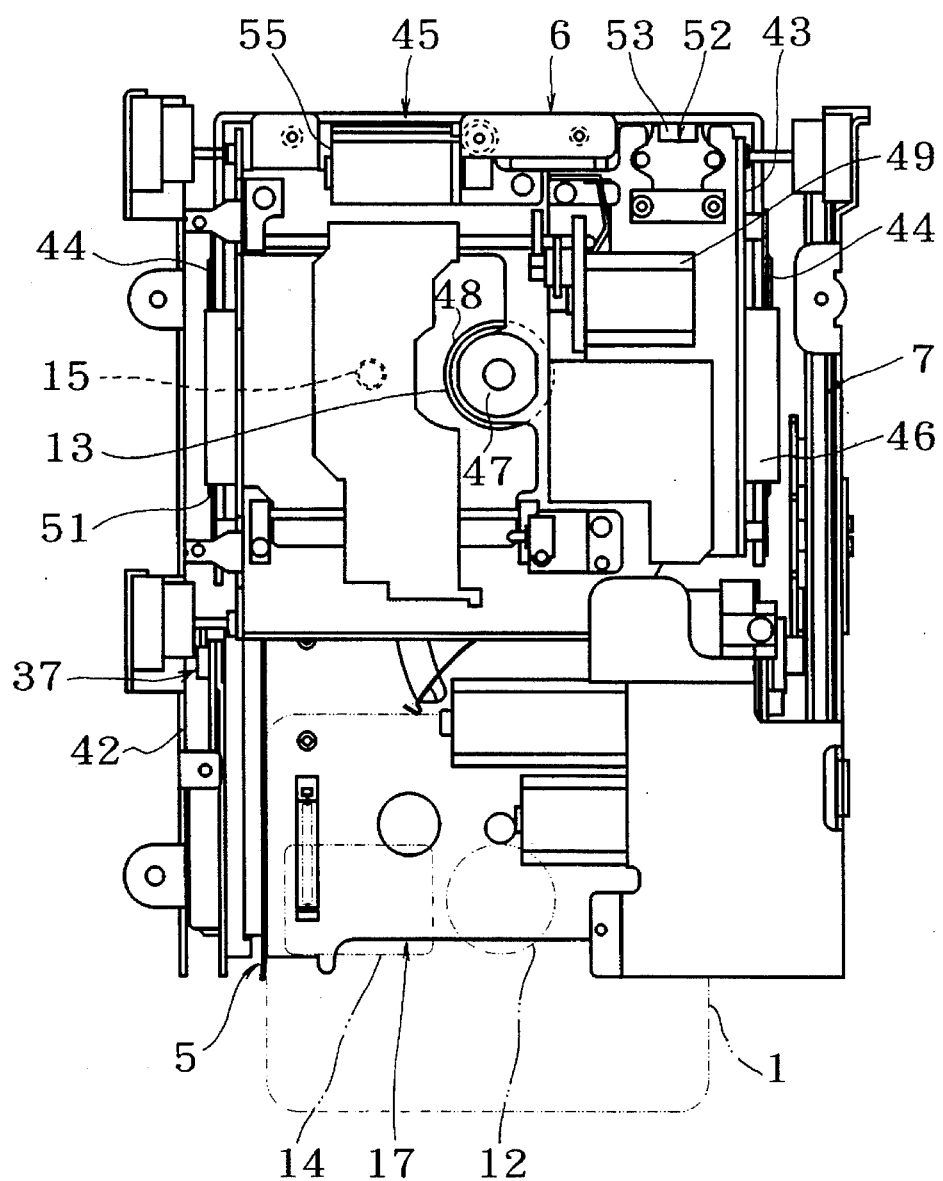
FIG. 3 is a bottom view showing main parts in one embodiment of the present invention.

As shown in FIG. 3, the multi-disk player comprises a containing portion 5 which can contain the three optical disk cassettes 1, a record playing equipment 6 disposed behind the containing portion 6, and a disk loader 7 for loading one optical disk cassette 1 selected out of the three optical disk cassettes 1 into the record playing equipment 6 from the containing portion 5 and returning the optical disk cassette 1 loaded in the record playing equipment 6 to its original position in the containing portion 5.

Figure 4:
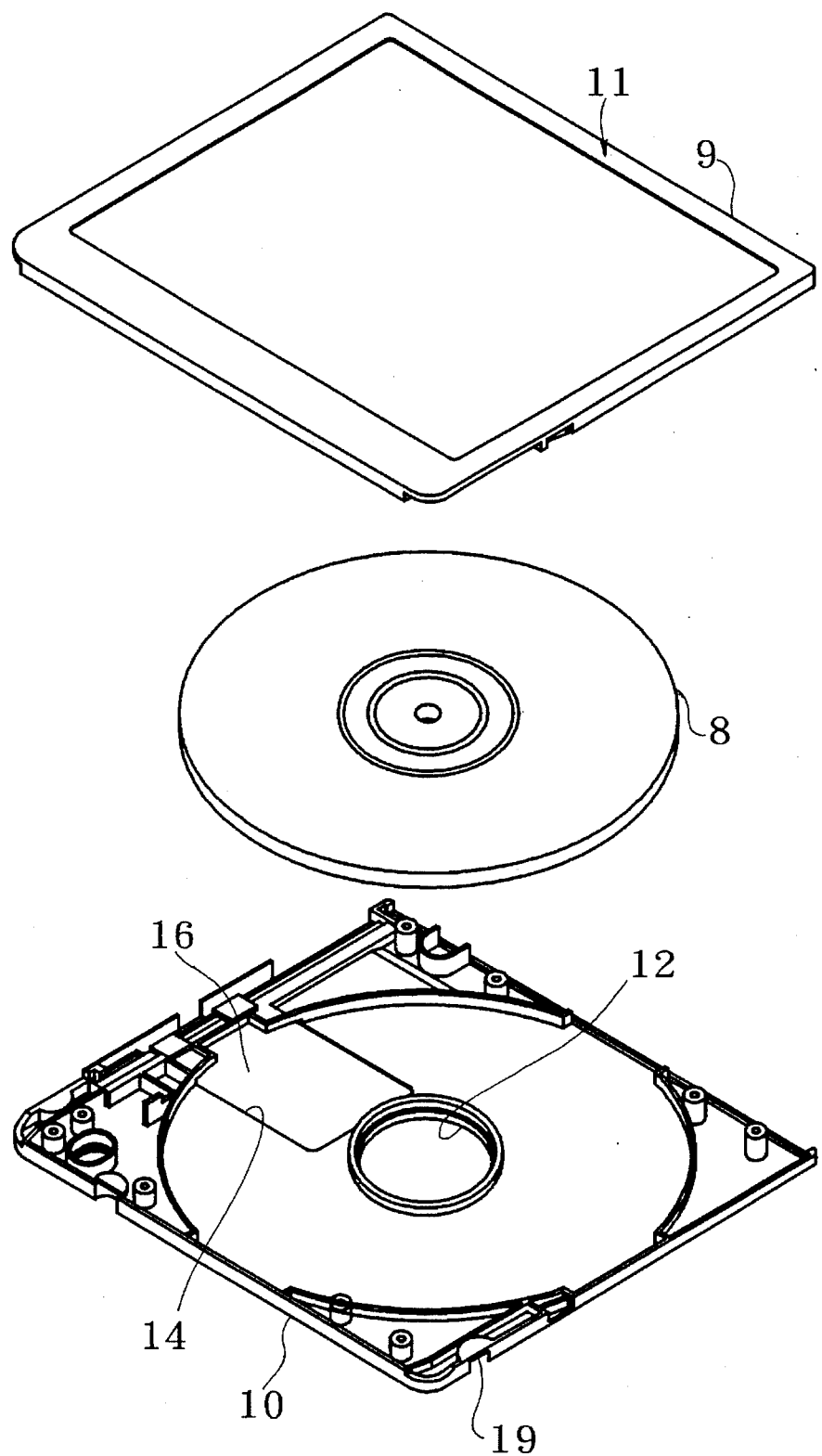
FIG. 4 is an exploded perspective view showing an optical disk cassette which is applied to one embodiment of the present invention.

As shown in FIG. 4, the above described optical disk cassette 1 is so adapted that an optical disk 8 having a diameter of 64 mm is rotatably inserted into a cassette case 11 comprising an upper shell 9 and a lower shell 10 each having a flat surface measuring approximately 72 mm×68 mm. A spindle hole 12 is formed in the center of the lower shell 10, and a spindle 13 (shown in FIG. 3) of the record playing equipment 6 is caused to enter the spindle hole 12 to rotate the optical disk 8. A window 14 is provided in one side part of the lower shell 10, and records on a recording surface of the optical disk 8 are read by an optical head 15 (shown in FIG. 3), which looks in the window 14, of the record playing equipment 6. The above described window 14 is opened or closed by a shutter 16 slidably supported on the lower shell 10.

Figure 5:
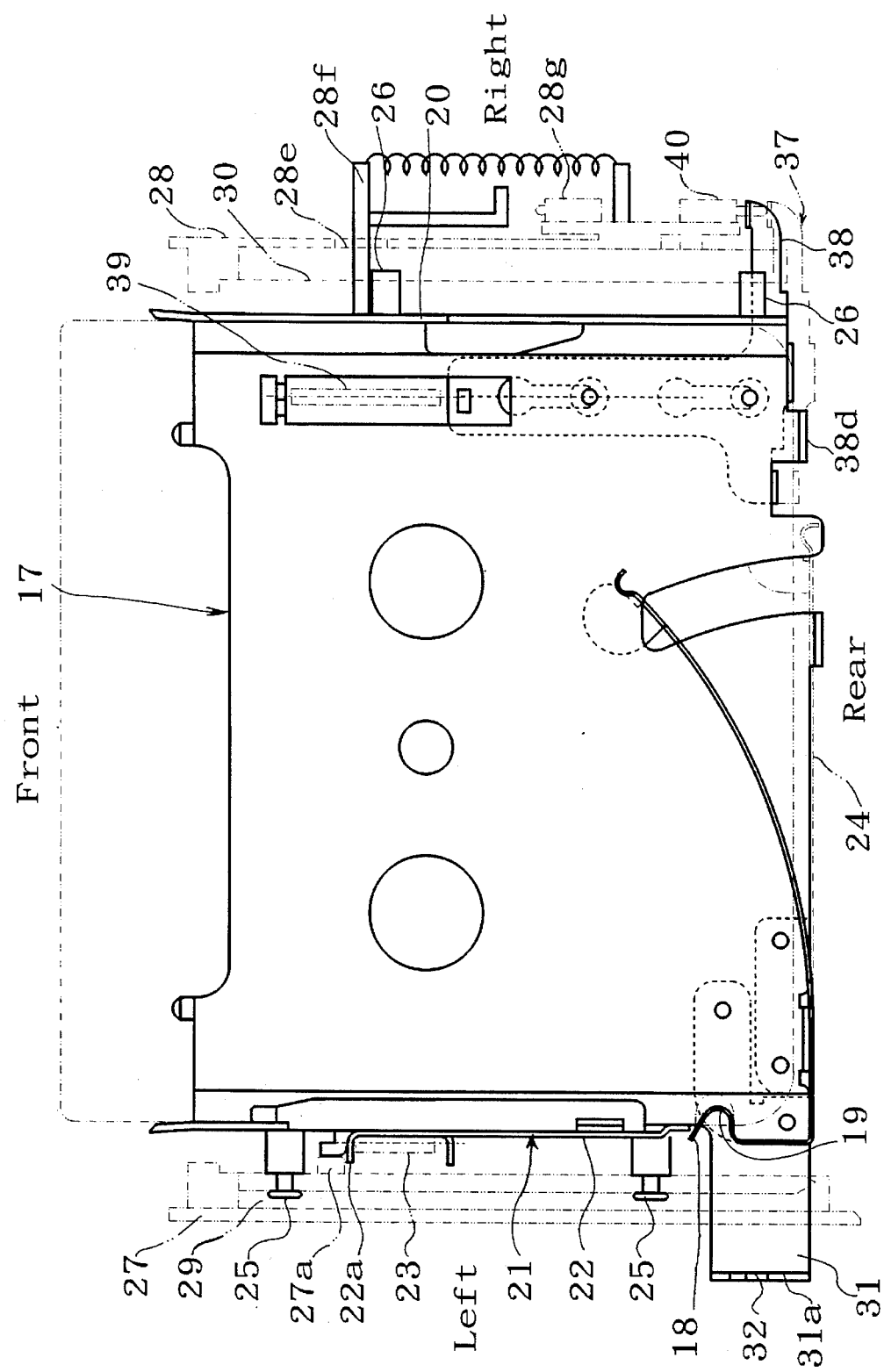
FIG. 5 is a bottom view showing a tray according to one embodiment of the present invention.

As shown in FIG. 3, the optical disk cassettes 1 are inserted one at a time into respective trays 17 made of a metal plate when they are respectively inserted into the containing portion 5 through the insertion ports 2. As shown in FIG. 5, the tray 17 has a clip 18 made of a plate spring entering in a V shape the lower part of its left rear edge, and a recess 19 to and from which the clip 18 is fitted and extracted is formed in a left rear edge of the lower shell 10. If the optical disk cassette 1 is inserted into the tray 17 to a predetermined depth, therefore, the clip 18 is fitted in the recess 19 of the lower shell 10. Accordingly, the optical disk cassette 1 is positioned in the tray 17 and held therein.

The shutter 16 of the optical disk cassette 1 is pushed open by a projection 20 formed by folding a part of the right sidewall of the tray 17 inward when the optical disk cassette 1 is inserted into the containing portion 5.

This multi-disk player comprises an ejecting device 21 for detaching, when any one of the ejection keys 3 is depressed, the clip 18 of the tray 17 corresponding to the ejection key 3 from the recess 19 of the lower shell 10 and ejecting the optical disk cassette 1 in the tray 17 forward.

Figure 9:
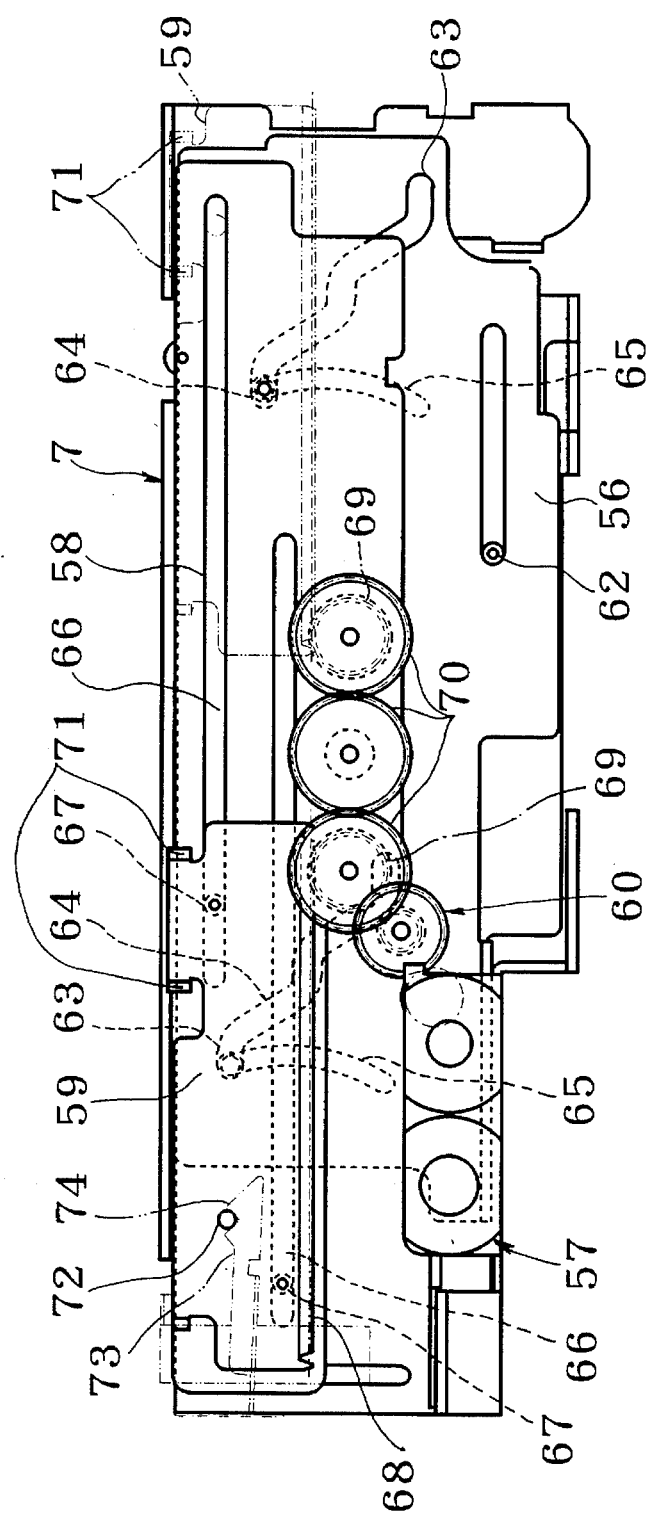
FIG. 9 is a side view showing a loading device according to one embodiment of the present invention.

This ejecting device 21 comprises the above described ejection keys 3, a slide plate 22 supported on the left sidewall of each of the trays 17 so as to be movable back and forth, a return spring 23 for urging the slide plate 22 forward, an ejection spring 24, and a slide plate 59 of the disk loader 7 (shown in FIG. 9).

If the ejection key 3 is operated, the slide plate 59 is moved to the height of the tray 17 corresponding to the ejection key 3, and is moved forward after an engaging portion 31 of the tray 17 is positioned between a pair of engaging members 71, to push the engaging portion 31 forward. At this time, an end 22a of the slide plate 22 is caught by a projection 27a provided in a guide member 27, whereby a rear end of the slide plate 22 pushes the clip 18. Consequently, the clip 18 is pushed out leftward, to be detached from the recess 19 of the optical disk cassette 1.

The above described ejection spring 24 comprises a plate spring formed to connect with the above described clip 18 and is so constructed that its one end is supported on the left rear of the tray 17 and the other end, that is, a free end advances to the center of the tray 17 in a natural state. If the optical disk cassette 1 is loaded into the tray 17, the rear surface of the optical disk cassette 1 pushes the free end of the ejection spring 24 into a right rear end of the tray 17. Thereafter, if the ejection key 3 is depressed to detach the clip 18 from the recess 19 of the optical disk cassette 1, the optical disk cassette 1 is ejected forward by an elastic restoring force of the ejection spring 24. Consequently, the front thereof is exposed from the insertion port 2, thereby to make it possible to pull the optical disk cassette 1 out by hand.

Figure 6:
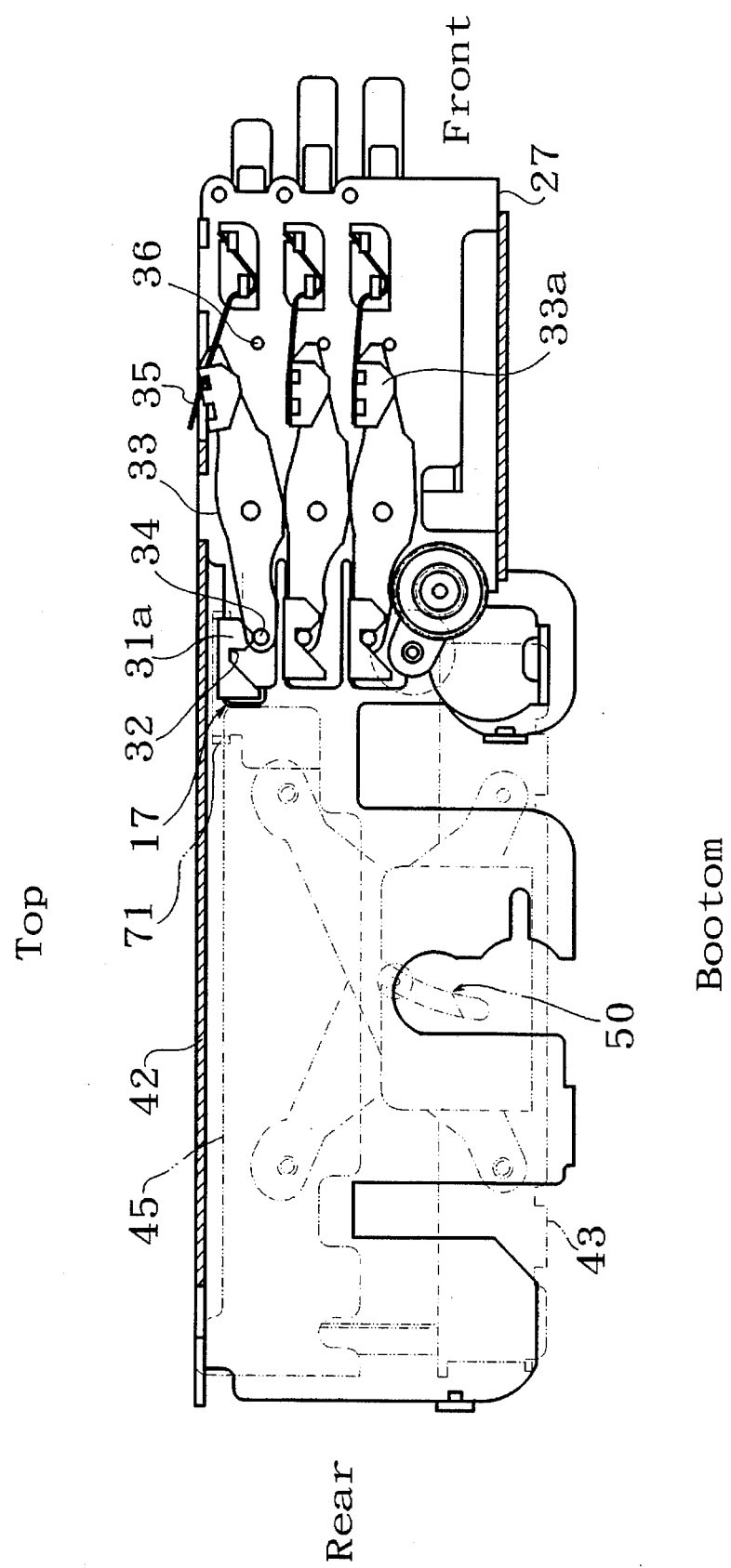
FIG. 6 is a side view showing a disk containing portion according to one embodiment of the present invention.

An engaging portion 31 extending toward the left of the guide member 27 is located in the left rear of each of the trays 17. A left end of the engaging portion 31 is further folded downward, as shown in FIG. 6, thereby to provide an engaging portion 31a. An inverted V-shaped positioning groove 32 is formed in a lower edge of the engaging portion 31a.

Three levers 33 corresponding to the respective trays 17 are supported rotatably in a seesaw shape on the left side surface of the guide member 27 on the left, and a positioning pin 34 is projected leftward from a rear end of each of the levers 33. The positioning pin 34 and the lever 33 are urged in a clockwise direction until a front end of the lever 33 is caught by a stopper 36 projected on the left side surface of the guide member 27 by a pressure bar spring 35 supported on the guide member 27. The positioning pin 34 is fitted in the positioning groove 32 of the tray 17, whereby the tray 17 is put in a predetermined position of the containing portion 5.

Figure 11:
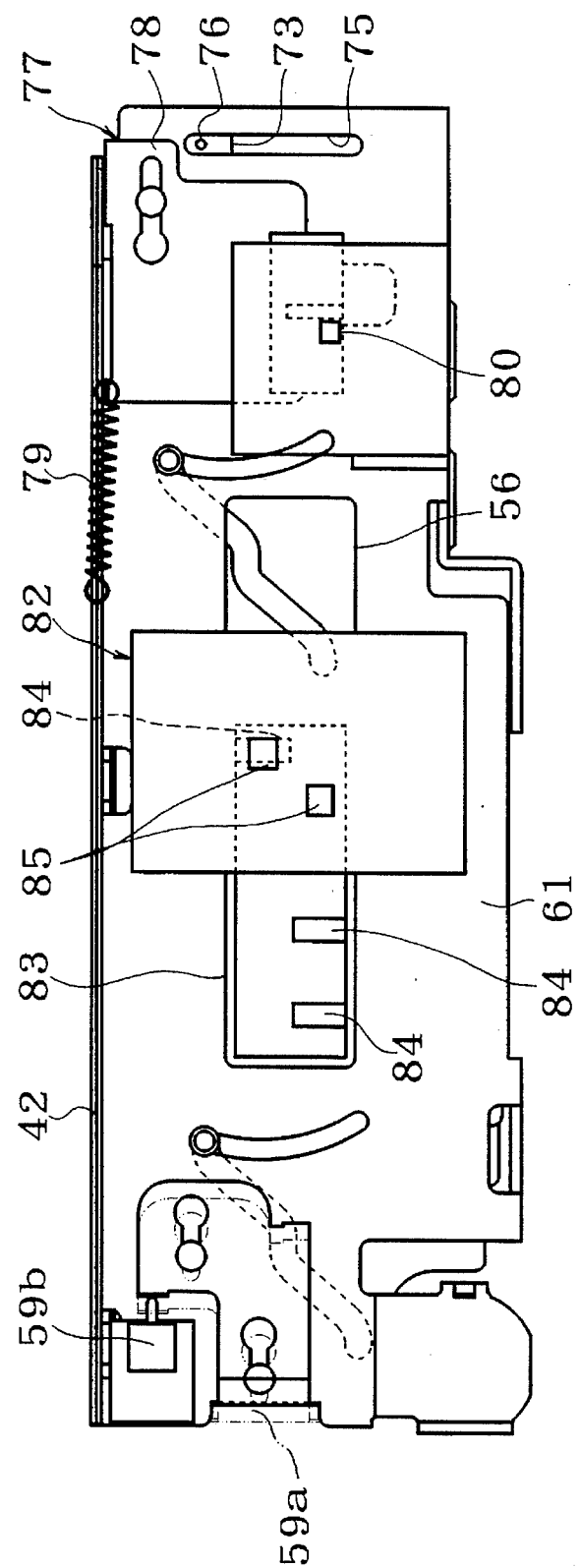
FIG. 11 is a side view showing main parts in one embodiment of the present invention.

The slide plate 59 is returned to a first predetermined forward position where a pair of engaging members 71 is positioned on both sides of the engaging portion 31 of the tray 17 which is put in a predetermined position, to wait until any one of the ejection keys 3 is operated in a position corresponding to the height of any one of the optical disk cassette 1. If any one of the ejection keys 3 is operated, the slide plate 59 starts to be moved forward after being moved to the height of the optical disk cassette 1 corresponding to the ejection key 3. For example, if the slide plate 59 is moved to a predetermined forward position where the rear engaging member 71 catches the engaging portion 31 of the tray 17, a proximity switch 80 shown in FIG. 11 is turned on.

The proximity switch 80 is turned on and then, is turned off by further forward movement of the slide plate 59. If the slide plate 59 is moved forward by further driving a motor continuously for, for example, one second on the basis of the termination of the on state, the positioning pin 34 is driven downward by the taper of the positioning groove 32, whereby the lever 33 is rotated in a counterclockwise direction. Accordingly, the tray 17 can be moved forward by a predetermined amount from a predetermined position. The optical disk cassette 1 is ejected in the above described manner while the tray 17 is moved forward by a predetermined amount from a predetermined position.

The slide plate 59 is moved forward at the time of ejection by driving the motor for, for example, one second on the basis of the termination of the on state of the proximity switch 80 as described above, and is returned to the position where the proximity switch 80 is turned on again after the time has elapsed. The tray 17 is also returned to a predetermined position as the slide plate 59 is returned. The slide plate 22 is returned to its original position by the return spring 23 at this time, whereby the clip 18 is returned to the position where it enters the tray 17.

Respective pairs of front and rear pins 25 and 26 are projected on both left and right sides of each of the trays 17. The pins 25 and 26 are respectively inserted into the guide grooves 29 and 30 formed in the guide members 27 and 28 provided on both left and right sides of the tray 17 movably back and forth.

As described in the foregoing, the tray 17 is positioned by fitting the positioning pin 34 in the positioning groove 32 of the engaging portion 31. The positioning groove 32 of the engaging portion 31 is so formed that the tray 17 is not moved backward even if the optical disk cassette 1 is forced into the tray 17 and the slide plate 59 is driven backward in a state where the tray 17 is positioned. Therefore, a pin which is engaged with a projection 33a of the lever 33 is formed in the slide plate 59. The lever 33 is first rotated to disengage the positioning pin 34 and the engaging portion 31 by the movement of the slide plate 59 and then, the tray 17 is moved by the engaging member 71.

As shown in FIG. 5, the containing portion 5 is provided with a cassette detecting device 37 so as to determine whether the optical disk cassette 1 is loaded into each of the trays 17 which is put in a predetermined position in the containing portion 5.

The cassette detecting device 37 comprises a detecting plate 38 supported on the right rear of each of the trays 17 movably back and forth, a return spring 39 for urging the detecting plate 38 forward, and a microswitch 40 which is supported on the right side of the guide member 28 on the right and is turned on or off by the advance or retreat of the detecting plate 38. If the optical disk cassette 1 is loaded into the tray 17, an end 38d of the detecting plate 38 is pushed backward by the optical disk cassette 1 against the return spring 39. If the microswitch 40 is turned off, therefore, the loading of the optical disk cassette 1 is detected.

The results of the detection are indicated by lighting one or both of a green loading indicator lamp 41 (shown in FIG. 1), for example, contained in the ejection key 3 corresponding to the tray 17, for example, or a loading indicator lamp provided on the front panel 4. If the optical disk cassette 1 is not loaded, the results are not reasonably indicated by lighting.

The above described record playing equipment 6 comprises a main body 43 supported on a chassis 42 common to the record playing equipment 6 and the containing portion 5, and a disk receiving frame 45 supported on the main body 43 movably up and down through a pair of right and left pantograph mechanisms 44.

As shown in FIG. 3, the above described main body 43 comprises a sub-chassis 46, a spindle motor 47 fixed to the sub-chassis 46, a spindle 48 fixed to an output shaft of the spindle motor 47, an optical head 15 supported on the sub-chassis 46 movably rightward and leftward, a head driving device 49 for driving the optical head 15, and a disk up-and-down driving device 50 (see FIG. 6) for driving the disk receiving frame 45 up and down.

The disk receiving frame 45 is provided with a pair of right and left guide rails 51 disposed with proper spacing in the lateral direction, and guide grooves into and from which the pairs of front and rear pins 25 and 26 projected on both left and right sides of the tray 17 as shown in FIG. 3 are respectively inserted and extracted from the front are respectively formed in the guide rails 51.

When the optical disk cassette 1 is transferred between the record playing equipment 6 and the containing portion 5, the disk up-and-down driving device 50 is operated to make the heights of the guide grooves of the disk receiving frame 45 equal to the heights of the guide grooves 29 and 30 of the tray 17 for holding the selected optical disk cassette 1 in the containing portion 5.

Figure 7:
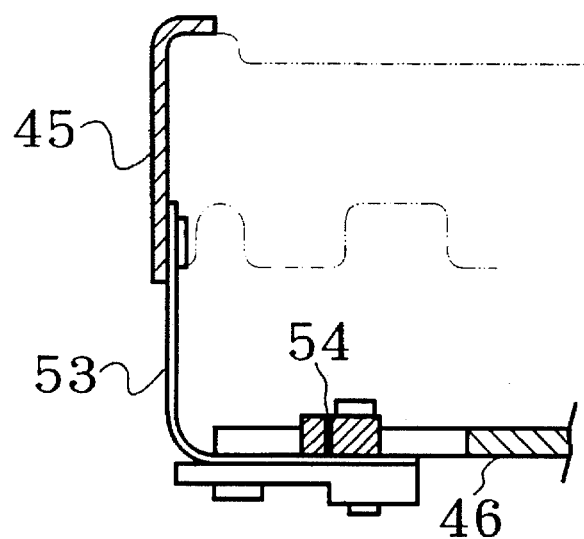
FIG. 7 is a cross sectional view showing a height detecting device for a disk receiving frame according to one embodiment of the present invention.
Figure 8:
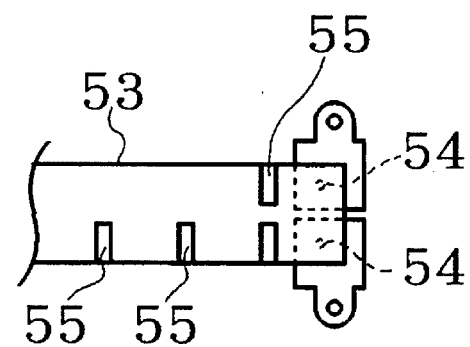
FIG. 8 is an exploded view showing the height detecting device for a disk receiving frame according to one embodiment of the present invention.

The height of the disk receiving frame 45 is detected by a detecting device 52 provided throughout from the sub-chassis 46 to the disk receiving frame 45. The detecting device 52 comprises a plate spring 53 having its one end fixed to the disk receiving frame 45 and its other end slidably held on the lower surface of the chassis 46, and a pair of electrodes 54 supported by the sub-chassis 46 so as to be slidably brought into contact with both edges of the plate spring 53, as shown in FIGS. 7 and 8. Slit 55 corresponding to a plurality of predetermined heights of the disk receiving frame 45 are formed in the above described plate spring 53.

In the detecting device 52, if the disk receiving frame 45 is raised and lowered, the middle part and the other end of the plate spring 53 move back and forth along the lower surface of the sub-chassis 46. If the slit 55 is put in the position of either one of the electrodes 54, both the electrodes 54 are insulated from each other, so that detection signals each composed of an OFF signal are outputted.

When the detection signals are outputted, therefore, it is judged which of the trays 17 has a height corresponding to a height at which the disk receiving frame 45 is positioned on the basis of the position where the disk up-and-down driving device 50 is started, the direction in which the disk up-and-down driving device 50 is driven, and the number of detection signals after starting the disk up-and-down driving device 50. The disk up-and-down driving device 50 is stopped at a height corresponding to the height of the selected tray 17, thereby to make the heights of the guide grooves of the disk receiving frame 45 equal to the heights of the guide grooves 29 and 30 of the tray 17 holding the selected optical disk cassette 1 in the containing portion 5.

The disk receiving frame 45 is provided with a positioning spring which is engaged with the pin 25 of the tray 17 for positioning the tray 17 itself.

Figure 10:
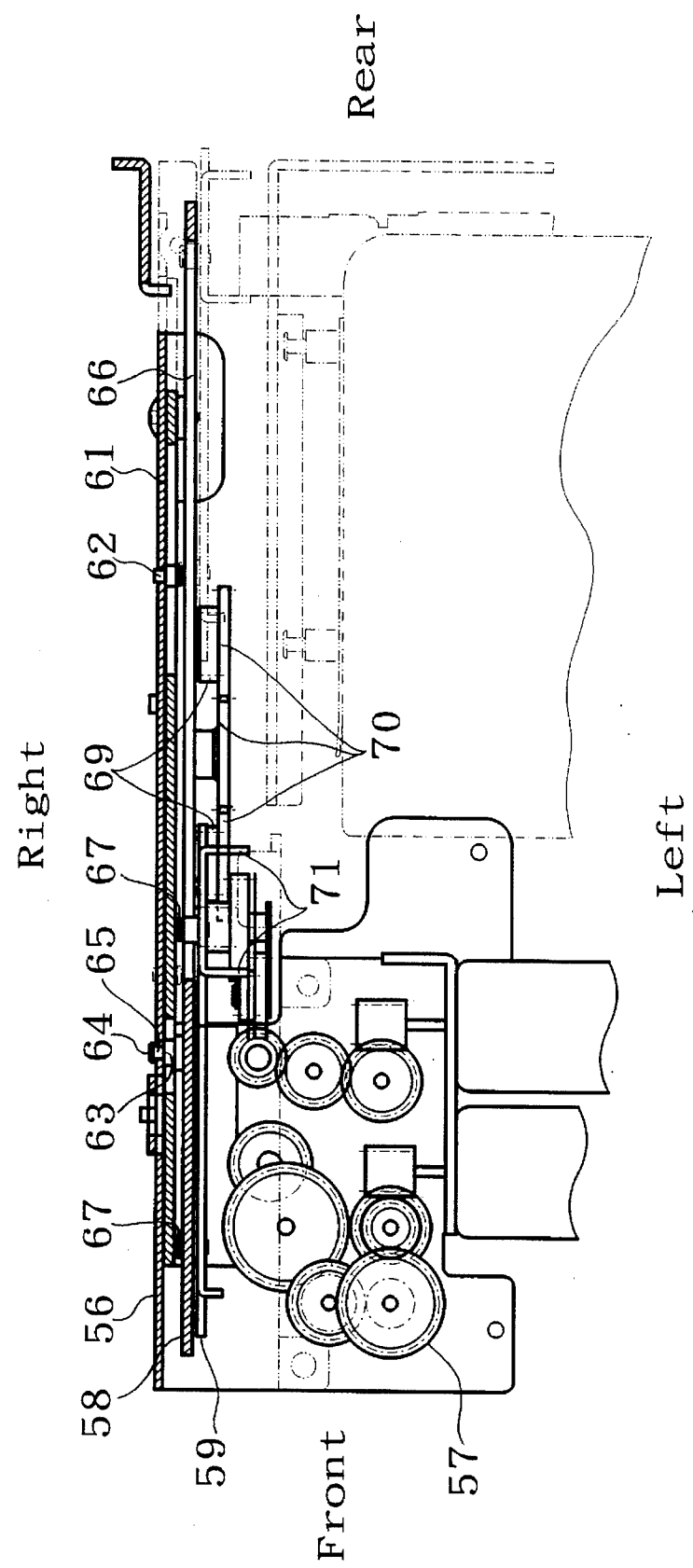
FIG. 10 is a plan view showing the loading device according to one embodiment of the present invention.

As shown in FIGS. 9 and 10, the above described disk loader 7 comprises an elevator 56, an up-and-down driving device 57, an up-and-down plate 58, a slide plate 59, and a back-and-forth driving device 60. The back-and-forth driving device 60 is of epicyclic gear construction. A pinion gear 69 and a gear of a motor are always connected to each other even if the up-and-down plate 58 is raised and lowered.

The above described elevator 56 is supported on the left of a right sidewall 61 of the chassis 42 through a pair of pins 62 movably back and forth, and is driven back and forth by the up-and-down driving device 57.

A cam groove 63 comprising three horizontal grooves having heights corresponding to the heights of the respective trays 17 and disposed in the order of height with predetermined spacing in the longitudinal direction and an inclined groove for causing the horizontal grooves to connect with each other in the order of height is formed in the above described up-and-down plate 58. In addition, an arc-shaped groove 65 extending upward and downward is formed on the right sidewall 61 of the chassis 42, and a pair of pins 64 corresponding to the cam groove 63 and the arc-shaped groove 65 is projected on the right side surface of the slide plate 59. The pins 64 are respectively inserted through the cam groove 63 and the arc-shaped groove 65. If the up-and-down plate 58 is moved back and forth, therefore, the slide plate 59 supported on the up-and-down plate 58 through the pins 64 is guided by the arc-shaped groove 65 to be raised and lowered.

A pair of upper and lower guide grooves 66 extending backward and forward is formed in the above described up-and-down plate 58, and a pair of pins 67 projected from the right surface of the slide plate 59 is slidably inserted into the guide grooves 66, respectively, whereby the slide plate 59 is supported on the up-and down plate 58 movably back and forth.

A rack 68 is formed throughout the entire length of a lower edge the slide plate 59, and two pinion gears 69 which are engaged with the rack 68 and three gears 70 which interlock both the pinion gears 69 in the same direction are rotatably supported on the up-and-down plate 58.

The plurality of pinion gears 69 and the rack 68 are thus engaged with each other, thereby to make it possible to increase the length of the stroke of the slide plate 59 to the length which is the sum of the length of the stroke and the spacing between the plurality of pinion gears 69. In other words, the length of the slide plate 59 is decreased by the spacing between the plurality of pinion gears 69, thereby to make it possible to miniaturize the multi-disk player as a whole.

The engaging members 71 projected leftward are projected properly spaced in the longitudinal direction in a rear end of the above described slide plate 59. When the slide plate 59 is put in a predetermined position in the vicinity of a front end of the stroke of the slide plate 59, the engaging portion 31 of each of the trays 17 is positioned between the engaging members 71 as viewed from the top.

Specifically, as shown in FIG. 9, a positioning pin 72 projected rightward is provided in a front end of the slide plate 59, and the positioning pin 72 is fitted in a positioning groove 74 of a positioning tool 73 supported on a front end of the up-and-down plate 58, thereby to put the slide plate 59 in a predetermined position.

As shown in FIG. 11, the position of the positioning tool 73 is held fixed by inserting a pin 76 of the positioning tool 73 through a longitudinal groove 75 formed at the front of the right sidewall 61 of the chassis 42 movably upward and downward.

As shown in FIG. 11, a loading detecting device 77 for determining whether or not the slide plate 59 is in this predetermined position is provided on the right sidewall 61 of the chassis 42.

The loading detecting device 77 comprises a detecting plate 78 supported on the right sidewall 61 of the chassis 42 movably back and forth, a return spring 79 for urging the detecting plate 78 backward, and the proximity switch 80 which is switched between its on and off states by the advance or retreat of the above described detecting plate 78.

The proximity switch 80 is turned off when the above described detecting plate 78 catches the front end of the slide plate 59 to move forward, as shown in FIG. 9, thereby to determine that the slide plate 59 and the tray 17 are put in predetermined wait positions.

If the tray 17 is moved from the containing portion 5 to the record playing portion 6, the above described determination is made by a moving member 28f facing the guide groove 30 from a hole 28e of the guide member 28 and a switch 28g, as shown in FIG. 5. Specifically, when the tray 17 is in the containing portion 5, the moving member 28f is moved forward against a spring by the pin 26, whereby the switch 28g is turned off. If the tray 17 is moved backward, the moving member 28f is moved by the spring, whereby the switch 28g is turned on. Consequently, a red loading indicator lamp 81, for example, contained in the ejection key 3 corresponding to the tray 17 which is moved to the record playing portion 6 is lighted, to take care not to erroneously insert the optical disk cassette 1 into the insertion port 2 having no tray 17.

Furthermore, as shown in FIG. 11, a height detecting device 82 is provided on the right sidewall 61 of the chassis 42 so as to determine which of the trays 17 is moved from the containing portion to the record playing portion 6.

The height detecting device 82 comprises a detecting plate 83 fixed to the left side surface of the elevator 56, driving members 84 provided properly spaced in the longitudinal direction above and below the detecting plate 83, and two proximity switches 85 which are turned on by the movement of the driving members 84 to the opposed positions. The upper proximity switch 85 is turned on when the elevator 56 retreats so that the up-and-down plate 58 and the slide plate 59 are at heights corresponding to the upper tray 17, the lower proximity switch 85 is turned on when the elevator 56 advances so that the up-and-down plate 58 and the slide plate 59 are at heights corresponding to the lower tray 17, and both the proximity switches 85 are turned on when the up-and-down plate 58 and the slide plate 59 are at heights corresponding to the intermediate tray 17. When the upper proximity switch 85 is turned on, it is determined by a counter value whether the height of the intermediate tray 17 is the height of the lower tray 17.

In this multi-disk player, a control circuit (not shown) composed of a microcomputer controls the motor, the indicator lamp and the like on the basis of each of the above described keys and switches, to obtain a desired operation. If the optical disk cassette 1 is inserted through the insertion port 2 and is held in the tray 17, the green indicator lamp 41 of the ejection key 3 corresponding to the tray 17 lights up. At this time, if the optical disk cassette 1 is also loaded into the other tray 17, the green indicator lamp 41 of the ejection key 3 corresponding to the tray 17 reasonably lights up. Thereafter, if the front panel 4 is closed to depress a multi-disk operating key provided on the front surface thereof, the slide plate 59 is raised and lowered to a height at which the engaging portion 31 of the tray 17 selected in accordance with a predetermined order or selected by a selection key provided on the front surface of the front panel 4 is positioned between the engaging members 71 of the slide plate 59 of the disk loader 7 and at the same time, the disk receiving frame 45 of the record playing portion 6 is raised and lowered to a height corresponding to the tray 17.

After the slide plate 59 and the disk receiving frame 45 are moved to heights corresponding to the selected tray 17, the slide plate 59 is moved backward, to put the tray 17 on the guide rail 51 of the disk receiving frame 45 from the guide members 27 and 28 of the containing portion 5.

At this time, a switch 28g provided to correspond to the tray 17 is turned on, so that the green indicator lamp 41 corresponding to the tray 17 goes out and a red loading indicator lamp 81 lights up.

Thereafter, the disk receiving frame 45 is lowered, and the spindle 48 is caused to enter the spindle hole 12 of the optical disk cassette 1 to be pressed against the center of the optical disk 8 to such a degree that it can be frictionally transmitted and then, the spindle motor 47 is started. Consequently, the reading of records by the optical head 49 is started. The slide plate 59 is returned to the containing portion 5, to prepare for an ejecting operation.

When the playing of the records is terminated, the slide plate 59 is moved from the containing portion 5 to the record playing equipment 6 and then, one end of an end 59*a* of the slide plate 59 abuts against a switch 59*b*, whereby the switch 59*b* is turned on. If it is thus determined that the slide plate 59 is moved to a predetermined position on the side of the record playing equipment 6, the containing portion 5 and the disk up-and-down driving device 50 are operated in the reverse direction to raise the disk receiving frame 45 to its original height, and the slide plate 59 of the disk loader 7 is moved forward to move the tray 17 from the disk receiving frame 39 to the containing portion 5, whereby the tray 17 is supported by the original guide members 27 and 28.

At this time, the switch 28*g* is turned off, so that the red loading indicator lamp 81 corresponding to the tray 17 goes out. Since the optical disk cassette 1 in the tray 17 is not in an ejected state, the microswitch 40 remains off, so that the green indicator lamp 41 corresponding to the tray 17 lights up.

If the ejection key 3 of any one of the optical disk cassettes 1 remaining in the containing portion 5 is depressed while records on the selected optical disk cassette 1 are being played, the optical disk cassette 1 is moving back and forth from and to the record playing equipment 6, or when all the optical disk cassettes 1 are contained in the containing portion 5, the clip 18 provided in the tray 17 is detached from the recess 19 of the optical disk cassette 1. Consequently, the ejection spring 24 is elastically restored, whereby the optical disk cassette 1 is pushed out forward and the front thereof is projected forward from the insertion port 2. At this time, the microswitch 40 is turned on. Accordingly, the green indicator lamp 41 corresponding to the tray 17 goes out even while records are being played. The optical disk cassette 1 whose front is projected from the insertion port 2 may be pushed into the insertion port 2 again, or may be extracted from the insertion port 2 to insert another optical disk cassette 1 into the insertion port 2. When the optical disk cassette 1 is inserted, the microswitch 40 is reasonably turned off. Accordingly, the green indicator lamp 41 corresponding to the tray 17 lights up.

Furthermore, it can be easily understood that two or more optical disk cassettes 1 remaining in the containing portion 5 can be simultaneously ejected by simultaneously depressing two or more ejection keys 3.

According to the multi-disk player, therefore, the optical disk cassette 1 remaining in the containing portion 5 while records are being played can be taken out and replaced, and another optical disk cassette 1 can be added. Consequently, the multi-disk player becomes more convenient for use.

Figure 12:
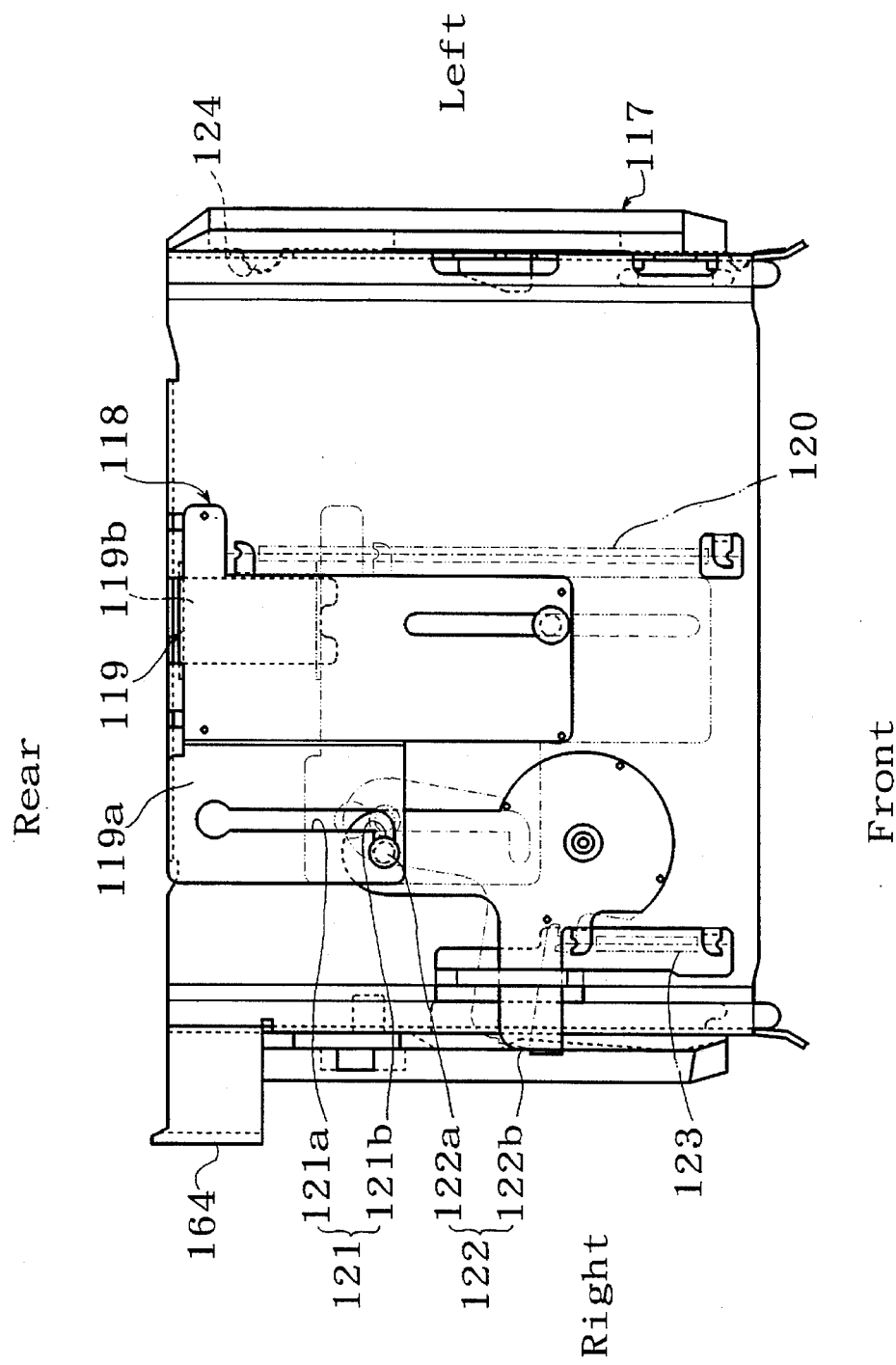
FIG. 12 is a plan view showing a tray according to another embodiment of the present invention.

In an ejecting device 118 according to another embodiment of the present invention shown in FIG. 12, an ejection plate 119 catching a front end of an optical disk cassette 1 is supported slidably back and forth on a tray 117. The ejection plate 119 has a horizontal plate 119*a* along the upper surface of the tray 117 and a vertical plate 119*b* extending downward from a rear end of the horizontal plate 119*a* and catching a rear end of the optical disk cassette 1.

Furthermore, bias means 120 composed of a helical tension spring is stretched between the horizontal plate 119*a* and the tray 117. Further, a latch slit 121 comprising a longitudinal slit 121*a* extending backward and forward and a transverse slit 121*b* continuously extended leftward from a front end of the longitudinal slit 121*a* is formed on the above described horizontal plate 119*a*. In addition, the ejecting device 118 is provided with a latch lever 122 having a pin 122*a* entering the latch slit 121 and a lever 122*b* projected toward the right of the tray 117 and supported on the tray 117 so as to be horizontally rotated around a position which is off-centered from the pin 122*a* and second bias means 123 composed of a helical tension spring for urging the latch lever 122 in the direction in which the pin 122*a* enters the transverse slit 121*b*.

If the optical disk cassette 1 is pushed into the tray 117, the ejection plate 119 is pushed backward. If the ejection plate 119 is pushed into the position of the transverse slit 121*b* with the pin 122*a* being in the longitudinal slit 121*a*, the second bias means 123 moves the pin 122*a* into the transverse slit 121*b*. Consequently, the ejection plate 119 is held in its set position, whereby the optical disk cassette 1 is held in a predetermined position of the tray 117 by a positioning spring 124.

Figure 13:
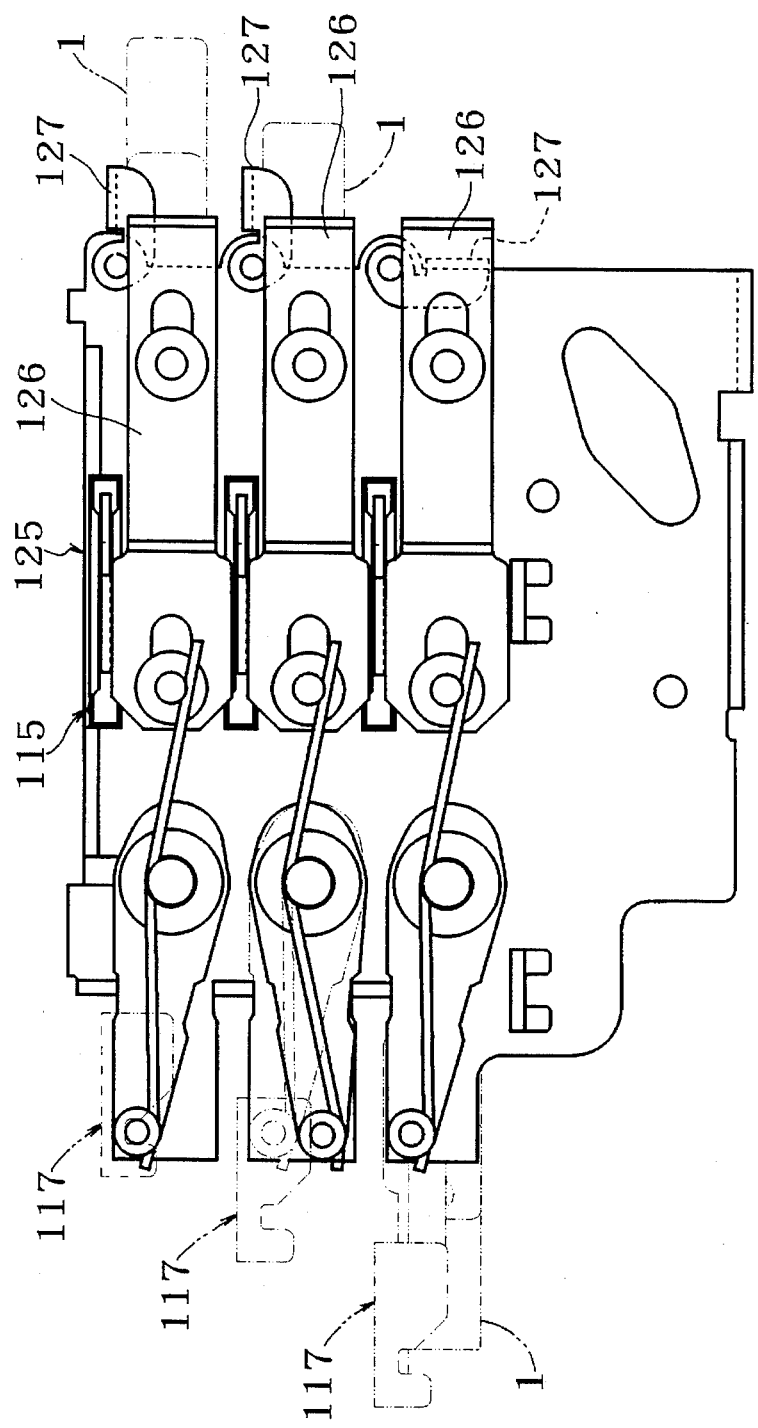
FIG. 13 is a side view showing a containing portion according to another embodiment of the present invention.

Furthermore, in the ejecting device 118 according to the present embodiment, sliding members 126 respectively corresponding to the trays 117 are provided in the containing portion 125, as shown in FIG. 13. If an arbitrary ejection key is pushed by not less than a predetermined amount, the sliding member 126 which retreats in synchronism with the ejection key pushes the lever 122*b* of the tray 117 corresponding to the ejection key backward against the second bias means 123, thereby to move the pin 122*a* from the transverse slit 121*b* to the longitudinal slit 121*a*. If the pin 122*a* is moved to the longitudinal slit 121*b*, the engagement between the pin 122*a* and the transverse slit 121*b* is nullified. Consequently, the ejection plate 119 is drawn forward vigorously by the bias means 120, whereby the optical disk cassette 1 is ejected from the tray 117.

In this tray 117, the ejection plate 119 is held in a predetermined position by the latch lever 122 even when the positioning function of the positioning spring 124 is lost by some reason, thereby to eliminate the possibility that the optical disk cassette 1 is ejected against its will. Accordingly, the optical disk cassette 1 can be ejected only when the ejection key 3 is arbitrarily operated.

The containing portion 125 according to the present embodiment is provided with gates 127 which are swingably raised and lowered ahead of the respective trays 117. Each of the gates 127 is urged downward by a spring (not shown). When the tray 117 is positioned in the containing portion 125, the gate 127 is pushed open upward to the front from the inside by a front end of the tray 117. Consequently, the optical disk cassette 1 can be freely inserted into an empty tray 117 from the front, or can be freely taken out from the tray 117.

If the tray 117 in which the optical disk cassette 1 is set is pulled out backward by not less than a predetermined amount from the containing portion 125, whereby the optical disk cassette 1 is moved toward the back of the front end of the containing portion 125, the above described gate 127 is moved downward to the rear from the upper front by a spring by being deprived of its support, to close the front of the tray 117. Consequently, another optical disk cassette 1 can be reliably prevented from being erroneously inserted into a space to be ensured in the containing portion 125 for the optical disk cassette 1 in which records are being played or which is moving back and forth from and to the record playing equipment and the tray 117.

Figure 14:
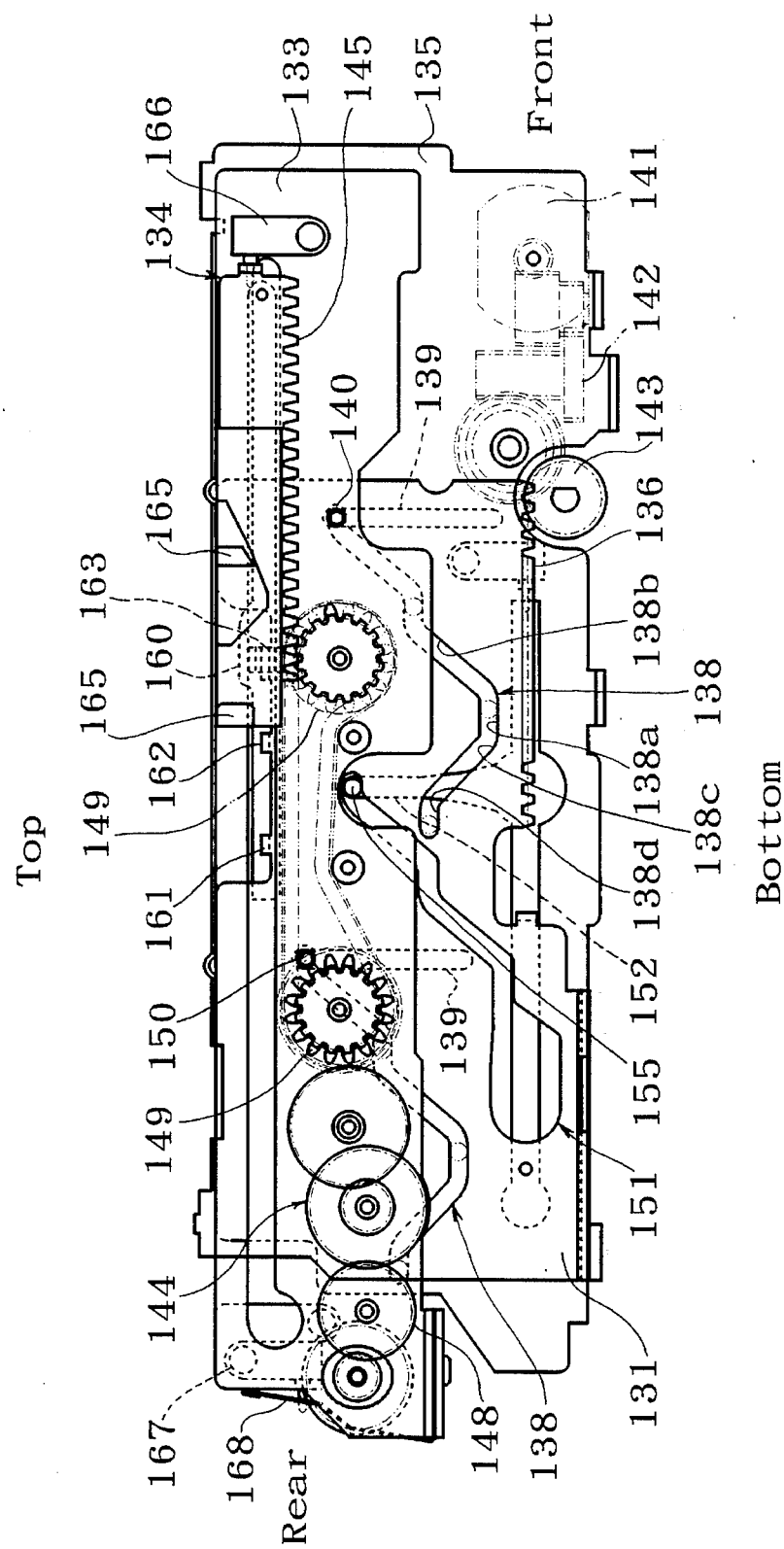
FIG. 14 is a side view showing a loading and unloading equipment according to another embodiment of the present invention.
Figure 15:
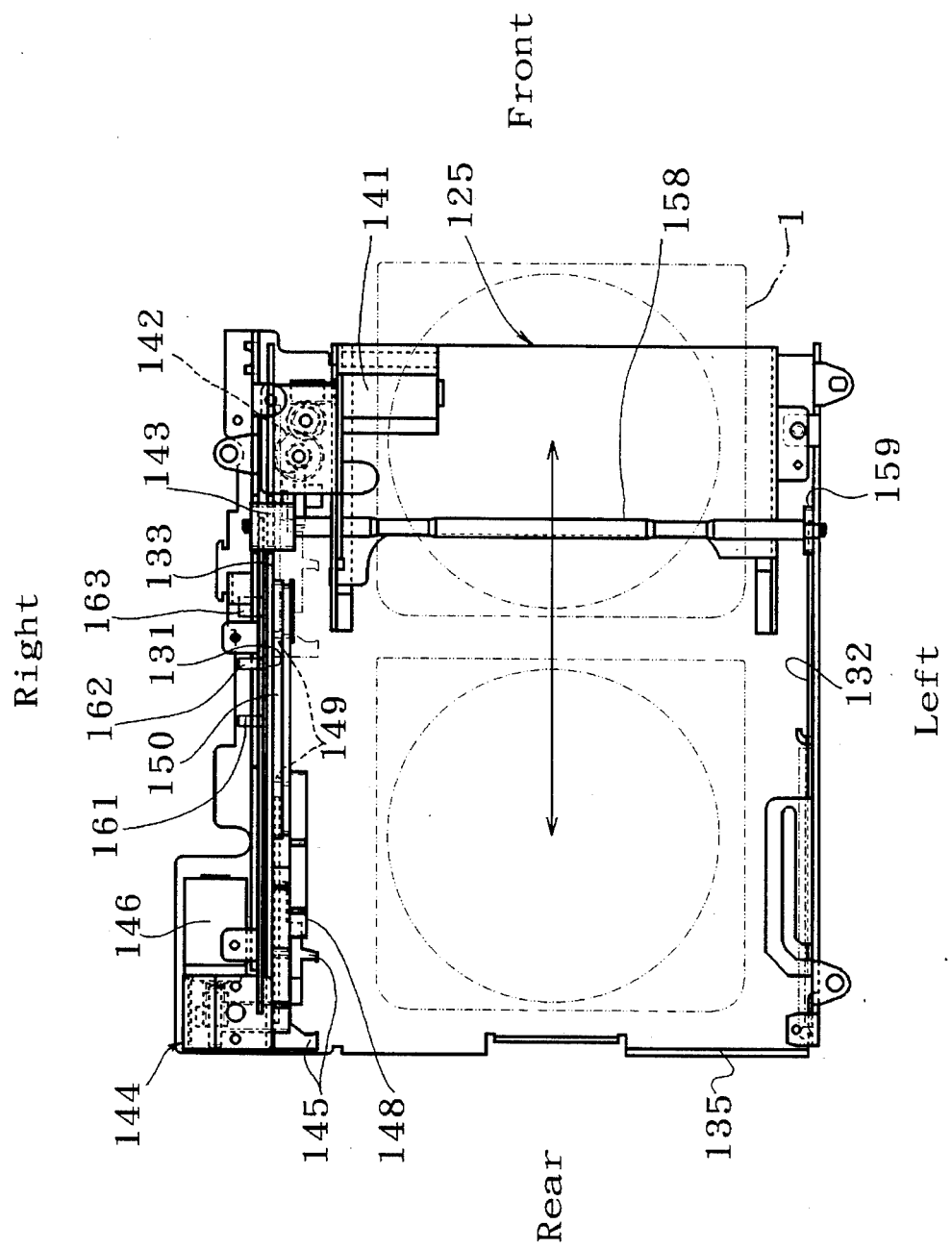
FIG. 15 is a plan view showing the loading and unloading equipment and a second elevator device according to another embodiment of the present invention.

Furthermore, as shown in FIGS. 14 and 15, an elevator device 130 according to the present embodiment comprises a pair of right and left cam plates 131 to 132, one up-and-down plate 133, one sliding member 134, and a synchronizing device 134 for mechanically interlocking both the cam plates 131 and 132.

Figure 16:
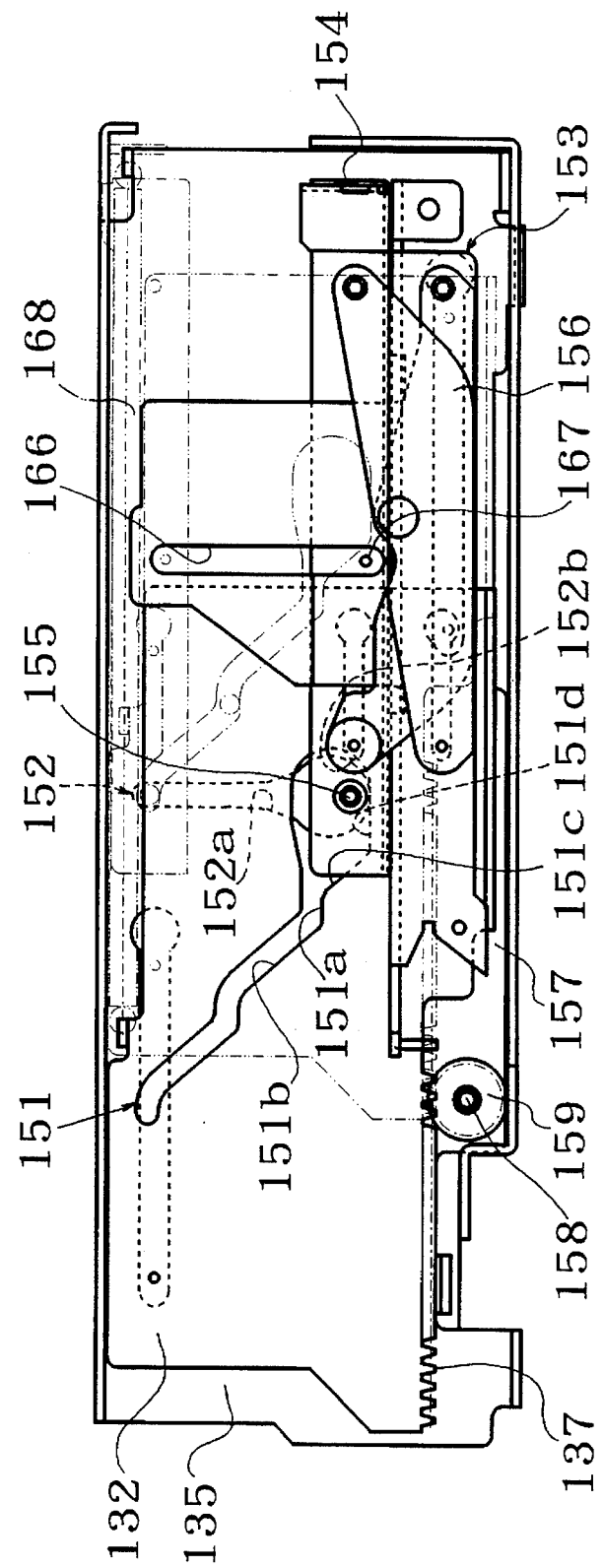
FIG. 16 is a side view showing the second elevator device according to another embodiment of the present invention.

As shown in FIGS. 14 and 16, both the cam plates 131 and 132 are respectively supported on a chassis 135 slidably back and forth, and racks 136 and 137 are formed in upper front edges of the cam plates 131 and 132.

Furthermore, as shown in FIG. 14, two rows of cam grooves 138 each having three horizontal grooves 138a having heights corresponding to the heights of the respective trays and disposed properly spaced in the longitudinal direction in the order of height and an inclined groove 138b for causing the respective grooves 138a to connect with each other in the order of height are formed properly spaced in the longitudinal direction in the cam plate 131 on the right out of the two cam plates. An extending inclined groove 138c extending from an end of the lowermost horizontal groove 138a to an arbitrary height larger than that of the other higher horizontal groove 138a on the opposite side to the other higher horizontal groove 138a and an extending horizontal groove 138d connecting with an upper end of the inclined groove 138c are formed in each of the cam grooves 138.

Two rows of guide grooves 139 composed of long holes are formed with the same spacing in the longitudinal direction as that between the cam grooves 138 on the right sidewall of the chassis 135, and two pins 140 projected on the outer side surface of the up-and-down plate 133 disposed inside of the above described cam plate 131 are inserted into the corresponding cam grooves 138 and guide grooves 139. A pinion 143 which is interlocked with an elevator motor 141 through an interlocking gear device 142 is engaged with the rack of the cam plate 131 to rotate the elevator motor 141 in the forward direction or the reverse direction. Consequently, the cam plate 131 is moved back and forth and is driven by the cam groove 138 and the pins 140 are guided by the guide grooves 139, whereby the up-and-down plate 133 is moved up and down.

The cam groove 138 is provided with the extending horizontal groove 138c and the extending horizontal groove 138d, whereby the up-and-down plate 133 and the sliding member 134 supported thereon can be held in a position above a main body 157 of a record playing equipment 153 shown in FIG. 16 at a height corresponding to the extending horizontal groove 138 while the optical disk cassette 1 is loaded into the record playing equipment 153, for example, in addition to a height corresponding to each of the trays 117.

The sliding member 134 is supported on the above described up-and-down plate 133 movably back and forth, and a sliding driving device 144 for driving the sliding member 134 is supported thereon. Another rack 145 is formed in a lower edge of the above described sliding member 134. The above described sliding driving device 144 is so constructed as to transmit the rotation of the slide motor 146 to one of two pinion gears 149 which are engaged with this rack 145 through a transmission gear device 148 and further transmit the rotation of the one pinion gear 149 to the other pinion gear 149 by a timing belt 150 to drive the sliding member 134, as shown in FIG. 15.

Different cam grooves 151 are respectively formed in both the above described cam plates 131 and 132. The cam grooves 151 are the same as the two rows of cam grooves 138 formed in the above described cam plate 131 on the right in that each of them has three horizontal grooves 151a respectively having heights corresponding to the heights of the trays and disposed properly spaced in the longitudinal direction in the order of height and an inclined groove 151b for causing the respective horizontal grooves 151a to connect with each other in the order of height. However, the cam grooves 151 differ from the cam grooves 138 in that each of them has a floating groove 151d having an extending inclined surface 151c extending from an end of the lowermost horizontal groove 151a to a predetermined height smaller than that of the other higher horizontal groove 151a on the opposite side to the other higher horizontal groove 151a (at the back thereof in this case).

Furthermore, each of the guide grooves 152 formed on both right and left sidewalls of the chassis 135 to correspond to the cam grooves 151 comprises a long hole 152a extending downward in a horn shape and a circular hole 152b connecting with a lower end of the long hole 152a and having a larger diameter than that of the lower end.

A pin 155 projected both rightward and leftward from a disk receiving frame 154 of the record playing equipment 153 is inserted through the cam groove 151 and the guide groove 152, as shown in FIG. 16. The disk receiving frame 154 is supported movably back and forth on the main body 157 of the record playing equipment 153 through a pantograph mechanism 156, and is urged toward the main body 157 by a spring (not shown). Although the main body 157 may be fixed to the chassis 135, the main body 157 is supported on the chassis 135 through a vibration control device. In addition, the movement in one of right and left directions of the pantograph mechanism 156 is regulated by a right end wall of the main body 157 provided with a guide groove 166. A spring is engaged with a groove formed in a top end of a pin 167 inserted through the guide groove 166, thereby to urge the pantograph mechanism 156 as well as regulate the movement in the other direction of the pantograph mechanism 156. Further, the cam plate 132 on the left is urged backward by a helical tension spring 168 stretched between the cam plate 132 on the left and a rear end of the chassis 135.

As shown in FIG. 14, a pinion 159 which is engaged with the rack 137 of the cam plate 132 on the left is connected to the pinion 143 for driving the cam plate 131 on the right by a synchronizing mechanism composed of an interlocking shaft 158. Consequently, the two cam plates 131 and 132 are synchronously moved back and forth, thereby to make it possible to put the disk receiving frame 154 to a height corresponding to the height of each of the trays and a position closer to the main body 157 than the height.

If the cam plates 131 and 132 are further moved from the positions of the cam plates 131 and 132 in which the pin 155 is positioned in the lowermost horizontal groove 151a toward the other higher horizontal groove 151a, that is, forward, the pin 155 urged by a spring force is guided by the extending inclined surface 151c to be moved toward the main body 157. The optical disk supported on the disk receiving frame 154 is pressed against the spindle of the main body 157 as the pin 155 is moved.

specifically, the elevator motor 141 used for raising and lowering the up-and-down plate 133 is also used for raising and lowering the disk receiving frame 154 without using a motor used for raising and lowering the disk receiving frame 154 to reduce the number of motors by one, resulting in reduced total cost.

One photointerrupter 160 is fixed to the upper part of the right sidewall of the chassis 135, and three tongue members 161, 162 and 163 which cross the photointerrupter 160 as the photointerrupter 160 is moved are projected outward to the right with predetermined spacing in the longitudinal direction on the upper part of the cam plate 131 on the right.

It is assumed that in the initial state, the up-and-down plate 133, the sliding member 134 and the disk receiving frame 154 are at heights corresponding to the tray 117 in the upper stage. In this case, the cam plate 131 is positioned in a rear stroke end in the initial state, so that the front tongue member 163 interrupts a light path between light emitting means and light receiving means of the photointerrupter 160.

If the optical disk cassette 1 in the upper stage is selected, the elevator motor 141 is not started, whereby the sliding member 134 can be moved from a front stroke end to the rear stroke end by rotating the slide motor 146 in the forward direction. An engaging portion 164 of the tray 117 in the upper stage (shown in FIG. 12) is positioned between a pair of front and rear engaging portions 165 of the sliding member 134. The tray 117 in the upper stage and the optical disk cassette 1 are loaded into the disk receiving frame 154 from the containing portion 125 by moving the sliding member 134 to the rear stroke end.

If the optical disk cassette 1 in the middle stage or the lower stage is selected, the elevator motor 141 is started in the forward direction, whereby the cam plates 131 and 132 are moved forward. The front tongue member 163 passes through the photointerrupter 160 to open the light path of the photointerrupter 160 while the cam plates 131 and 132 are moving forward and then, the middle tongue member 162 interrupts the light path of the photointerrupter 160, thereby to determine that the sliding member 134 and the disk receiving frame 154 are at heights corresponding to the intermediate tray 117.

If the tray 117 in the middle stage is selected, the elevator motor 141 is stopped when the middle tongue member 162 is detected, whereby the tray 117 in the middle stage and the optical disk cassette 1 are loaded into the disk receiving frame 154 from the containing portion 125.

If the tray 117 in the lower stage is selected, the front tongue member 163 passes through the photointerrupter 160 to open the light path of the photointerrupter 160 and then, the middle tongue member 162 and the rear tongue member 161 interrupt the light path of the photointerrupter 160 twice, thereby to determine that the up-and-down plate 133, the sliding member 134 and the disk receiving frame 154 are at heights corresponding to the tray 117 in the middle stage and at the same time, the elevator motor 141 is stopped, whereby the tray 117 in the lower stage and the optical disk cassette 1 are loaded into the disk receiving frame 154 from the containing portion 125.

After the tray 117 in any stage and the optical disk cassette 1 are loaded into the disk receiving frame 154, the elevator motor 141 is rotated in the forward direction, thereby to move the cam plates 131 and 132 to the front stroke end consequently, the disk receiving frame 154 is moved toward the main body 157, thereby to start to play records.

The main body 157 is provided with a limit switch (not shown) which is operated in the stroke end of the cam plate 131. If the limit switch is turned on or off, the elevator motor 141 is stopped. In this state, a state where records can be played is detected.

If the ejection key corresponding to the optical disk cassette 1 in which records are being played is depressed once, the playing of the records is interrupted, so that the elevator motor 141 is rotated in the reverse direction. Consequently, the up-and-down plate 133, the sliding member 134 and the disk receiving frame 154 are returned to heights corresponding to the optical disk cassette 1. Thereafter, the slide motor 136 is rotated in the reverse direction, so that the sliding member 134 moves forward. Consequently, the tray 117 and the optical disk cassette 1 are returned to the containing portion 125 from the disk receiving frame 154. If the same ejection key is depressed once again after the tray 117 and the optical disk cassette 1 are returned to the containing portion 125, the optical disk cassette 1 is ejected from the tray 117.

Although in the present embodiment, the photointerrupter 160 is used, it can be determined that the up-and-down plate 133, the sliding member 134 and the disk receiving frame 154 are put in positions corresponding to the height of any one of the optical disk cassettes 1 by only providing one of sensors such as proximity switches, microswitches and photosensors if the cam plate 131 or 132 is thus provided with portions to be detected such as tongue members 117, projections, recesses, slits and magnetic members whose number is the same as the number of stages of the trays 117 properly spaced in the direction in which the cam plate 131 or 132 advances or retreats. The number of sensors in a detecting device for detecting the heights of the up-and-down plate 133, the sliding member 134 and the disk receiving frame 154 is thus decreased to one, thereby to make it possible to simplify the construction as well as reduce the entire cost.

In the above described embodiment, it is determined by switching the microswitch 166 fixed to the front of the up-and-down plate 133 to an on or off state by the sliding member 134 that the sliding member 134 is positioned in the front stroke end, and it is determined by pressing the plate spring 168 for switching the microswitch 167 fixed to the rear of the up-and-down plate 133 to an on or off state backward by the sliding member 134 to turn the microswitch 167 off or on that the sliding member 134 is positioned in the rear stroke end.

It goes without saying that the sliding member 134 may be provided with two portions to be detected such as tongue members, projections, recesses, slits and magnetic members are provided properly spaced in the longitudinal direction so that one sensor supported on the up-and-down plate 133 senses which of the stroke ends is a stroke end in which the sliding member 134 is positioned, thereby to make it possible to further reduce the entire cost.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multi-disk player for selectively playing one of a plurality of disks each in a disk cassette, comprising:

recording/playing means;

a containing portion adjacent said recording/playing means for holding a plurality of trays arranged in a stack, each tray for holding a disk cassette containing an optical disk, said tray being extractable in a first direction from said containing portion toward said recording/playing means and in an opposite direction from said recording/playing means to said containing means;

a panel at the front of said containing portion having a plurality of stacked insertion ports, a disk cassette being insertable through a port onto a tray of said container portion;

a sliding device for reciprocally moving a selected disk cassette and tray between said containing portion and said recording/playing means;

a first elevator for raising and lowering said sliding device to a height corresponding to the height of the selected disk cassette, a disk cassette receiving frame provided in said recording/playing means for receiving the selected disk cassette from said containing portion, a second elevator for raising and lowering the height of said disk cassette receiving frame to a height corresponding to the height of the selected disk cassette in said containing portion, a catching member supported reciprocally movably for catching the end of the selected disk facing said recording/playing means, a bias means for each tray for urging said catching member toward the front of said containing portion, a locking member for each tray for locking the disk cassette pushed onto the tray against said bias means in a predetermined portion, an ejecting means for each tray for releasing locking operation of said locking member, a respective ejecting key for driving each ejecting means, and an interlocking means for said ejecting means and said ejecting key when said tray is positioned in the containing portion.

2. The multi-disk player according to claim 1 further comprising detecting means for detecting the contained state and the playing state of each of the disk cassettes, and indicating means for indicating the contained state and the playing state of each of said disk cassettes in response to an output of said detecting means.

3. The multi-disk player according to claim 1, further comprising:

a means for interlocking said first and second elevators; and a motor for commonly driving both of said first and second elevators.

4. The multi-disk player according to claim 1, wherein:

one of said sliding device and a movable component which is moved with respect to said sliding device being provided with detecting portions of a number corresponding to a plurality of positions, the other of said sliding device and movable component having means for detecting one of said detecting portions, and a means for stopping said movable component and said sliding device with a predetermined spacing therebetween.

5. The multi-disk player according to claim 1, wherein:

said locking member comprises a first plate spring for positioning a disk cassette in a tray, and said catching member comprises a second plate spring formed to connect with the first plate spring.

6. The multi-disk player according to claim 1 wherein with a selected disk in said recording/playing means a first actuation of said ejecting key operates said sliding device to return said selected disk to said containing portion and a second actuation of said ejecting key causes ejection of said selected disk from its tray.

7. A multi-disk player for selectively playing one of a plurality of disks each in a disk cassette, comprising:

recording/playing means;

a containing portion adjacent said recording/playing means for holding a plurality of trays arranged in a stack, each tray for holding a disk cassette containing an optical disk, said tray being extractable in a first direction from said containing portion toward said recording/playing means and in an opposite direction from said recording/playing means to said containing means;

a panel at the front of said containing portion having a plurality of stacked insertion ports, a disk cassette being insertable through a port onto a tray of said container portion;

a sliding device for reciprocally moving a selected disk cassette and tray between said containing portion and said recording/playing means;

a first elevator for raising and lowering said sliding device to a height corresponding to the height of the selected disk cassette, a disk cassette receiving frame provided in the recording/playing means for receiving the selected disk cassette from said containing portion, a second elevator for raising and lowering the height of said disk cassette receiving frame to a height corresponding to the height of the selected disk cassette in said containing portion, a catching member supported reciprocally movably in directions to and away from said recording/playing means for catching the end of the selected disk facing said recording/playing means, a horizontal plate provided in said catching member on a surface of each tray, a first bias means stretched between said horizontal plate and the main body of each tray for urging said catching member in a direction to engage a disk cassette on a tray;

a latch lever on each tray which is displaceable from a latch position where said catching member is received to a releasing position where it is not received, a second bias means for each tray for urging said latch lever toward the latch position, a moving means in each tray for moving said latch lever toward the releasing position against said second bias means, an ejecting means for each tray for starting operation of said moving means and moving said latch lever toward the releasing position, an ejecting key for each tray for operating said ejecting means, and means for each tray for interlocking said ejecting means and said ejecting key when the tray is positioned in said containing portion.

8. The multi-disk player according to claim 7, further comprising:

means for interlocking the first and second elevators, and a motor for common driving of said first and second elevators.

9. The multi-disk player according to claim 7, wherein:

one of said sliding device and a movable component which is moved with respect to said sliding device being provided with detecting portions of a number corresponding to a plurality of positions, the other of said sliding device and movable component having means for detecting one of said detecting portions, and means for stopping said movable component and said sliding device with a predetermined spacing therebetween.

10. The multi-disk player according to claim 7 wherein with a selected disk in said recording/playing means a first actuation of said ejecting key operates said sliding device to return said selected disk to said containing portion and a second actuation of said ejecting key causes ejection of said selected disk from its tray.

* * * * *